(12) United States Patent
Mizukoshi

(10) Patent No.: US 12,314,858 B2
(45) Date of Patent: May 27, 2025

(54) NEURAL NETWORK LEARNING DEVICE, METHOD, AND PROGRAM

(71) Applicant: NEC Corporation, Tokyo (JP)

(72) Inventor: Yasuhiro Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1008 days.

(21) Appl. No.: 17/418,007

(22) PCT Filed: Oct. 11, 2019

(86) PCT No.: PCT/JP2019/040179
§ 371 (c)(1),
(2) Date: Jun. 24, 2021

(87) PCT Pub. No.: WO2020/137090
PCT Pub. Date: Jul. 2, 2020

(65) Prior Publication Data
US 2022/0076125 A1   Mar. 10, 2022

(30) Foreign Application Priority Data
Dec. 28, 2018   (JP) .................................. 2018-247337

(51) Int. Cl.
*G06N 3/04*         (2023.01)
*G06F 18/21*        (2023.01)
*G06N 3/082*        (2023.01)

(52) U.S. Cl.
CPC ........... *G06N 3/082* (2013.01); *G06F 18/217* (2023.01); *G06N 3/04* (2013.01)

(58) Field of Classification Search
CPC ...... G06N 3/082; G06N 3/04; G06F 18/2178; G06F 18/217
See application file for complete search history.

(56) References Cited

U.S. PATENT DOCUMENTS

2018/0349759 A1   12/2018   Isogawa et al.

FOREIGN PATENT DOCUMENTS

| JP | 2006163808 A | 6/2006 |
|---|---|---|
| JP | 2017182319 A | 10/2017 |

(Continued)

OTHER PUBLICATIONS

Arora, et al, Understanding Deep Neural Networks with Rectified Linear Units, Retrieved from Internet:<https://arxiv.org/abs/1611.01491> (Year: 2016).*

(Continued)

*Primary Examiner* — Paul M Knight
*Assistant Examiner* — Bart I Rylander

(57) ABSTRACT

The learning unit 81 learns a neural network. The linearization quantity determination unit 82 determines linearization quantity, which is a parameter included in an activation function used in the neural network, and which is a parameter that brings the activation function closer to a linear function by increasing or decreasing itself. The aggregation unit 83 replaces the activation function, which is determined to converge to a linear function by increasing or decreasing the linearization quantity, with the linear function, and aggregating weights among layers using the replaced linear function. The learning unit 81 calculates evaluation value based on output by the neural network in learning the neural network, and the linearization quantity determination unit 82 changes the linearization quantity when the evaluation value satisfies the predetermined criterion.

12 Claims, 29 Drawing Sheets

(56) References Cited

FOREIGN PATENT DOCUMENTS

| JP | 2018160200 A | 10/2018 |
|----|--------------|---------|
| JP | 2018206382 A | 12/2018 |

OTHER PUBLICATIONS

Glorot, et al, Understanding the difficulty of training deep feed forward neural networks, Retrieved from Internet:<https://proceedings.mlr.press/v9/glorot10a> (Year: 2010).*

Guan, S., et al, Incremental Neural Network Training with an Increasing Input Dimension, Retrieved from Internet:<https://www.degruyter.com/document/doi/10.1515/JISYS.2004.13.1.71/html> (Year: 2004).*

He, et al, Delving Deep into Rectifiers: Surpassing Human-Level Performance on ImageNet Classification, Retrieved from Internet:<https://openaccess.thecvf.com/content_iccv_2015/html/He_Delving_Deep_into_ICCV_2015_paper.html> (Year: 2016).*

Ozbay, Y., et al, A new method for classification of ECG arrhythmias using neural network with adaptive activation function, Retrieved from Internet:<https://www.sciencedirect.com/science/article/pii/S1051200409001948> (Year: 200).*

Raiko, T., et al, Deep Learning Made Easier by Linear Transformations in Perceptrons, Retrieved from Internet:<https://proceedings.mlr.press/v22/raiko12.html> (Year: 2012).*

Zhang, W., Input Dimension Determination of Linear Feedback Neural Network Applied for System Identification of Linear Systems, Retrieved from Internet:<https://link.springer.com/chapter/10.1007/978-3-319-59081-3_47> (Year: 2017).*

Dushkoff, et al, Adaptive Activation Functions for Deep Networks, Retrieved from Internet: (Year: 2016).*

Qian, et al., Adaptive activation functions in convolutional neural networks, Retrieved from Internet:<https://www.sciencedirect.com/science/article/pii/S0925231217311980> (Year: 2017).*

International Search Report for PCT Application No. PCT/JP2019/040179, mailed on Dec. 24, 2019.

English translation of Written opinion for PCT Application No. PCT/JP2019/040179, mailed on Dec. 24, 2019.

* cited by examiner

FIG. 24

```
                                                              D1
def makelink ( )
    link1 = link (n_in, n_units1)
    link2 = link (n_units1, n_units2)
    link3 = link (n_units2, n_units3)
    link4 = link (n_units3, n_units4)
    link5 = link (n_units4, n_out)

def forward (in)
    h1 = gstanh (in, link1, gamma)
    h2 = gstanh (h1, link2, gamma)
    h3 = gstanh (h2, link3, gamma)
    h4 = gstanh (h3, link4, gamma)
    out = gstanh (h4, link5, gamma)
    return out
```

⬇ REWRITE

```
                                                              D2
def makelink ( )
    link1 = link (n_in, n_out)

def forward (in)
    out = linear (in, link1)
    return out
```

FIG. 25

```
                                                                D3
def makelink ( )
    link1 = link (n_in, n_units1)
    link2 = link (n_units1, n_units2)
    link3 = link (n_units2, n_units3)
    link4 = link (n_units3, n_units4)
    link5 = link (n_units4, n_out)
    link6 = link (n_out, n_out)

def forward (in)
    h1 = gstanh (in, link1, gamma)
    h2 = gstanh (h1, link2, gamma)
    h3 = gstanh (h2, link3, gamma)
    h4 = gstanh (h3, link4, gamma)
    h5 = gstanh (h4, link5, gamma)
    out = softmax (h5, link6)
    return out
```

⬇ REWRITE

```
                                                                D4
def makelink ( )
    link1 = link (n_in, n_out)
    link2 = link (n_out, n_out)

def forward (in)
    h1 = linear (in, link1)
    out = softmax (h1, link2)
    return out
```

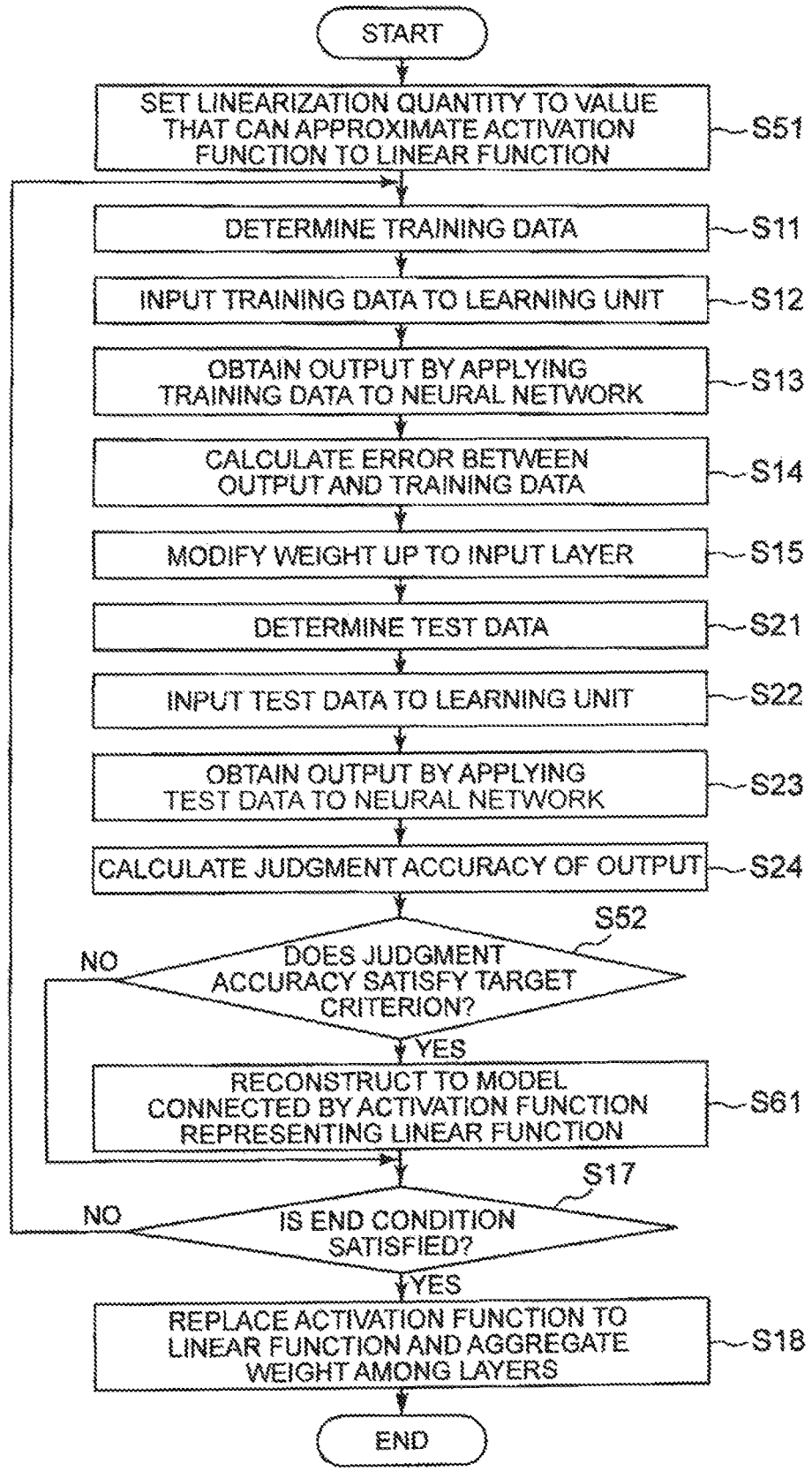

FIG. 28

```
                                              D5
def makelink ( )
      link1 = link (n_in, n_units1)
      link2 = link (n_units1, n_units2)
      link3 = link (n_units2, n_units3)
      link4 = link (n_units3, n_units4)
      link5 = link (n_units4, n_out)

def forward (in)
      h1 = gstanh (in, link1, gamma)
      h2 = gstanh (h1, link2, gamma)
      h3 = gstanh (h2, link3, gamma)
      h4 = gstanh (h3, link4, gamma)
      out = gstanh (h4, link5, gamma)
      return out
```

⬇ REWRITE

```
                                              D6
def makelink ( )
      link1 = link (n_in, n_units1)
      link2 = link (n_units1, n_units2)
      link3 = link (n_units2, n_units3)
      link4 = link (n_units3, n_out)

def forward (in)
      h1 = gstanh (in, link1, gamma)
      h2 = gstanh (h1, link2, gamma)
      h3 = gstanh (h2, link3, gamma)
      out = gstanh (h3, link4, gamma)
      return out
```

NEURAL NETWORK LEARNING DEVICE, METHOD, AND PROGRAM

This application is a National Stage Entry of PCT/JP2019/040179 filed on Oct. 11, 2019, which claims priority from Japanese Patent Application 2018-247337 filed on Dec. 28, 2018, the contents of all of which are incorporated herein by reference, in their entirety.

TECHNICAL FIELD

The present invention relates to a neural network learning device, a neural network learning method, and a neural network learning program for learning neural networks.

BACKGROUND ART

A neural network is one of the models used in machine learning, and is a mathematical model of the neural network in the human brain. A neural network includes an input layer and an output layer, and a weight W, which indicates the strength of the connections between neurons, is considered between each layer. In addition, an intermediate layer (hidden layer) is included between the input and output layers to represent a complex model. In order to distinguish them from neural networks in neuroscience, neural networks used in machine learning are sometimes referred to as artificial neural networks.

The initial artificial neural network, called a simple perceptron, has a structure that uses the input ($In_i$) and the weights (W) of each layer to obtain the output ($Out_i$). FIG. 32 is an explanatory diagram depicting a structure of a neural network. In the artificial neural network shown in FIG. 32, for example, $Out_1$ is the result of adding the outputs from each $In_i$ (i=1 to 3) multiplied by the weight $w_{1i}$.

FIG. 33 is an explanatory diagram depicting a linearly separable problem and a linearly non-separable problem. The simple perceptron can be used to solve linearly separable problems as shown in FIG. 33(a). On the other hand, the simple perceptron, because of its simple structure, cannot solve problems that are linearly non-separable as shown in FIG. 33(b). Therefore, the multilayer perceptron is commonly used to deal with linearly non-separable problems.

FIG. 34 is an explanatory diagram depicting a multilayer perceptron. The multilayer perceptron has a structure where the output ($Out_i$) is obtained from the input ($In_i$) using the weights ($w_i$) of each layer. The multilayer perceptron shown in FIG. 34 has four hidden layers. For example, the intermediate layer $H_{11}$ is calculated by Equation 1 shown below. In a similar way, the values in each intermediate layer are calculated in the forward direction.

[Math. 1]

$$H_{11} = \varphi\left(\sum_{i=1}^{3} w_{1i} In_i + b\right) \quad \text{(Equation 1)}$$

In Equation 1, b is the bias value. Also, $W_{1i}$ in Equation 1 is calculated by Equation 2 shown below.

[Math. 2]

$$W_1 = \begin{pmatrix} w_{11} & w_{12} & w_{13} \\ w_{21} & w_{22} & w_{23} \\ w_{31} & w_{32} & w_{33} \end{pmatrix} \quad \text{(Equation 2)}$$

FIG. 35 is an explanatory diagram depicting a nonlinear function. The activation function $\psi(x)$ used to model the brain is a nonlinear function as shown in FIG. 35. By using the multilayer perceptron, even linear non-separable problems can be solved.

Neural networks are used, for example, in deep learning, and because they can output highly accurate results for complex inputs, their use in various fields is expanding. For this reason, various methods have been proposed to properly learn neural networks.

For example, Patent Literature 1 describes a learning method for a neural network that efficiently completes the learning process. In the learning method described in Patent Literature 1, when the accuracy of the output of the neural network is not improved, the parameters are returned to the past state and the learning rate is also reduced, and then learning is performed again with the parameters returned to the past state and the reduced learning rate.

CITATION LIST

Patent Literature

Patent Literature 1: Japanese Patent Laid-Open No. 2018-160200

SUMMARY OF INVENTION

Technical Problem

In the learning process of a neural network, the error back propagation method is used to modify weights from the error between the training data corresponding to the input and the output. FIG. 36 is an explanatory diagram depicting an example of a general method for learning a neural network using a computer.

The computer determines the training data 111 from the training data set 110 (Step S110). The computer inputs the determined training data 111 as input data 112 to the multilayer neural network 113 (Step S120) and obtains the output data 114 (Step S130). The computer calculates an error between the output data 114 and the training data 111 (Step S140). The computer propagates the calculated error in input direction and modifies the weights (Step S150, Step S160). The amount of correction is determined by the learning rate. Once the weights up to the input layer have been modified, the computer repeats the process from step S110 onward.

It is known that linearly separable problems can be solved with a simple perceptron. However, in situations where current neural networks are utilized, such as the method described in Patent Literature 1, learning is performed as a linear non-separable problem, regardless of whether the learning target is linearly separable or not. In this case, since a nonlinear function is used for the calculation of each layer, the meaning of the weights of each layer is not known, and the number of layers (or intermediate layers) of the neural network designed before learning as a structure cannot be changed, so the amount of calculation cannot be reduced.

Therefore, it is an object of the present invention to provide a neural network learning device, a neural network learning method, and a neural network learning program that can learn a neural network so as to reduce the amount of computation.

Solution to Problem

A neural network learning device includes: a learning unit for learning a neural network; a linearization quantity determination unit for determining linearization quantity, which is a parameter included in an activation function used in the neural network, and which is a parameter that brings the activation function closer to a linear function by increasing or decreasing itself; and an aggregation unit for replacing the activation function, which is determined to converge to a linear function by increasing or decreasing the linearization quantity, with the linear function, and aggregating weights among layers using the replaced linear function, wherein the learning unit calculates evaluation value based on output by the neural network in learning the neural network, and the linearization quantity determination unit changes the linearization quantity when the evaluation value satisfies the predetermined criterion.

A neural network learning method includes: learning a neural network; in learning of the neural network, calculating an evaluation value based on the output of the neural network; determining linearization quantity, which is a parameter included in an activation function used in the neural network, and which is a parameter that brings the activation function closer to a linear function by increasing or decreasing itself; changing the linearization quantity when the evaluation value satisfies the predetermined criterion; and replacing the activation function, which is determined to converge to a linear function by increasing or decreasing the linearization quantity, with the linear function, and aggregating weights among layers using the replaced linear function.

A neural network learning program causing a computer to execute: a learning process of learning a neural network; a linearization quantity determination process of determining linearization quantity, which is a parameter included in an activation function used in the neural network, and which is a parameter that brings the activation function closer to a linear function by increasing or decreasing itself; and an aggregation process of replacing the activation function, which is determined to converge to a linear function by increasing or decreasing the linearization quantity, with the linear function, and aggregating weights among layers using the replaced linear function, wherein in the learning process, the computer is caused to calculate evaluation value based on output by the neural network in learning the neural network, and in the linearization quantity determination process, the computer is caused to change the linearization quantity when the evaluation value satisfies the predetermined criterion.

Advantageous Effects of Invention

According to the present invention, it is possible to learn a neural network so as to reduce the amount of computation.

BRIEF DESCRIPTION OF DRAWINGS

FIG. 24 It depicts an explanatory diagram depicting an example of how to reconstruct a neural network.

FIG. 25 It depicts an explanatory diagram depicting another example of how to reconstruct a neural network.

FIG. 26 It depicts a flowchart depicting an example of the operation of the neural network learning device of the fifth exemplary embodiment.

FIG. 28 It depicts an explanatory diagram depicting an example of the process of reconstructing a neural network.

DESCRIPTION OF EMBODIMENTS

Hereinafter, exemplary embodiments of the present invention will be described with reference to the drawings.

Exemplary Embodiment 1

Figure 1:
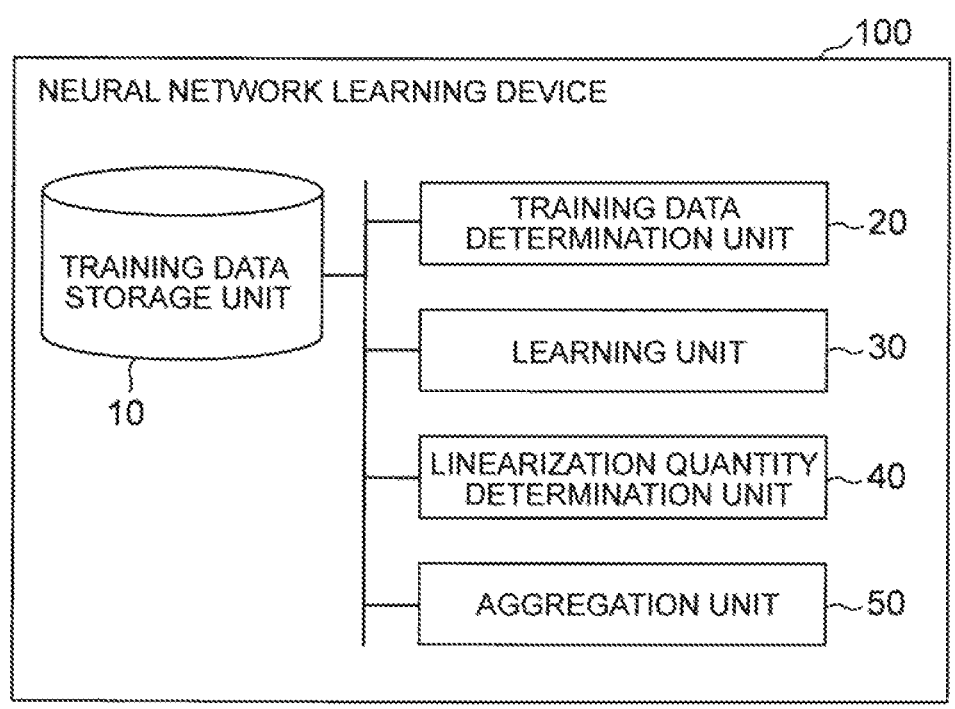
FIG. 1 It depicts a block diagram depicting an example of the structure of a first exemplary embodiment of a neural network learning device according to the present invention.

FIG. 1 is a block diagram depicting an example of the structure of a first exemplary embodiment of a neural network learning device according to the present invention. The neural network learning device 100 in the present invention has a training data storage unit 10, a training data determination unit 20, a learning unit 30, a linearization quantity determination unit 40, and an aggregation unit 50.

The training data storage unit 10 stores a plurality of training data (training data set) used for learning by the learning unit 30 described below. The training data storage unit 10 may also store various parameters necessary for the learning unit 30 to generate a model, which will be described later. In this exemplary embodiment, it is assumed that the network structure including the input layer, the number of intermediate layers, the output layer, and the connection form of each layer are predetermined using parameters, etc., before learning and stored in the training data storage unit 10. The training data storage unit 10 is realized by, for example, a magnetic disk.

The training data determination unit 20 obtains the training data from the training data storage unit 10 and inputs it to the learning unit 30. The method by which the training data determination unit 20 determines the training data to be obtained is arbitrary. The training data determination unit 20 may also identify the training data used for learning by the learning unit 30 described below.

The learning unit 30 learns the neural network using the training data input by the training data determination unit 20. The learning unit 30 can learn the neural network using widely known methods. In this exemplary embodiment, it is described how the learning unit 30 learns the neural network using the error back propagation method. Specifically, the learning unit 30 inputs the input training data to the (multilayer) neural network and obtains the output. Then, the learning unit 30 calculates the error between the output and the training data, propagates the calculated error from the output to the input direction, and modifies the weights of each layer up to the input layer. Since the amount of modification is determined by the learning rate, the learning rate to be used can be predetermined.

Furthermore, in this exemplary embodiment, the learning unit 30 calculates an evaluation value based on the output by the neural network when learning the neural network. The evaluation values calculated by the learning unit 30 include the error between the output and the training data, the accuracy of judging the output by verification data, and the number of outputs.

In this exemplary embodiment, it is explained the case where the learning unit 30 uses the calculated error as an evaluation value. In other words, the learning unit 30 calculates the error between the training data and the output by the neural network in learning the neural network.

The linearization quantity determination unit 40 determines the parameter included in the activation function used in the neural network that brings the activation function closer to a linear function by increasing or decreasing it (hereinafter referred to as the linearization quantity). Specifically, the linearization quantity determination unit 40 changes the linearization quantity by a predetermined quantity when the evaluation value calculated by the learning unit 30 satisfies the predetermined criterion. In this exemplary embodiment, the method of increasing or decreasing the linearization quantity will be described.

The function shown in Equation 3 below is an example of an activation function that includes a linearization quantity $\gamma$.

[Math. 3]

$$\varphi(x) = \gamma \tanh\left(\frac{x}{\gamma}\right) \quad \text{(Equation 3)}$$

Figure 2:
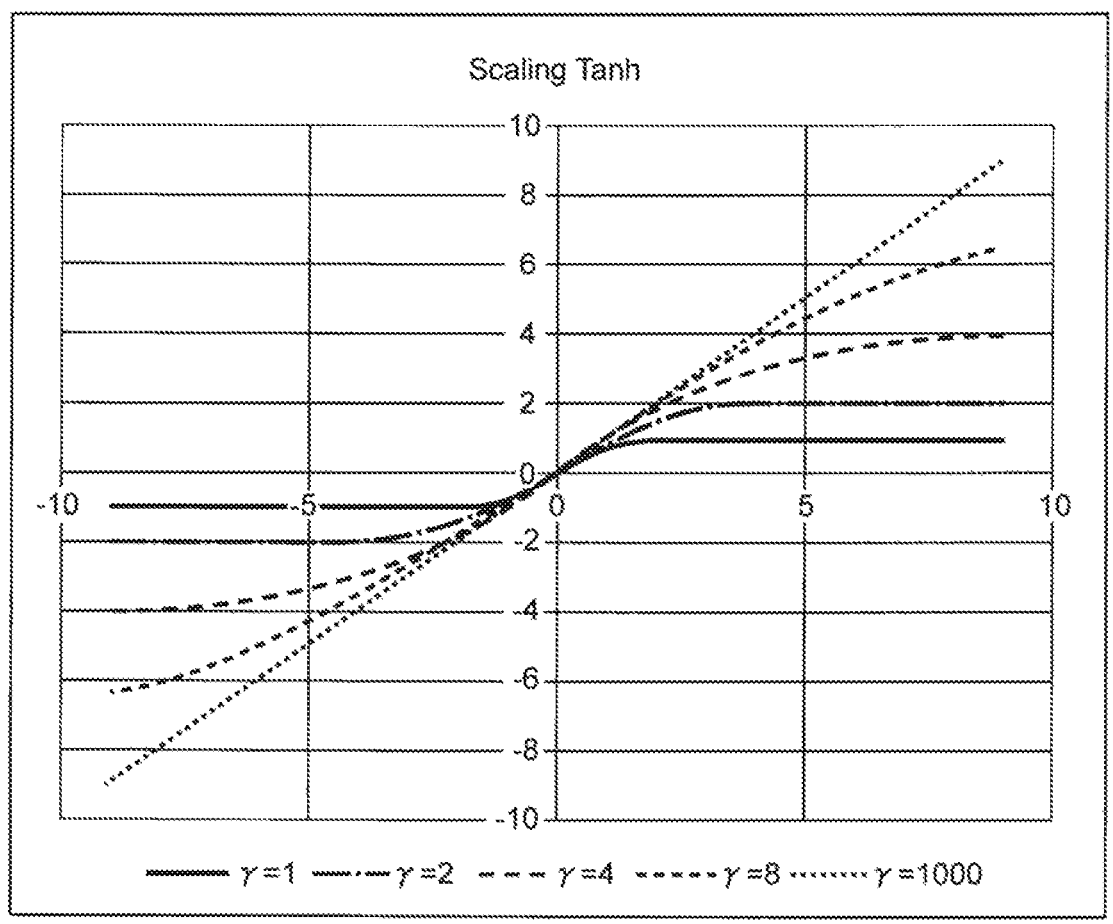
FIG. 2 It depicts an explanatory diagram depicting an example of a change in Scaling Tanh.

The activation function shown in Equation 3 is called Scaling Tanh, which approaches the linear function y=x as $\gamma$ is increased. FIG. 2 is an explanatory diagram depicting an example of changing Scaling Tanh. FIG. 2 illustrates the change in the graph when $\gamma$ is varied from 1 to 1000. As illustrated in FIG. 2, in Equation 3 above, when $\gamma>0$, the output does not exceed $\pm\gamma$. Also, the derivative in Equation 3 has a slope of 1 near the origin, as shown in Equation 4 below.

[Math. 4]

$$\varphi(x) = 1 - \left(\frac{\varphi(x)}{\gamma}\right)^2 \quad \text{(Equation 4)}$$

The linearization quantity determination unit 40 sequentially increases or decreases the linearization quantity $\gamma$ in the learning process. In this exemplary embodiment, the linearization quantity determination unit 40 increases or decreases the linearization quantity in accordance with the decrease in the error. For example, the linearization quantity determination unit 40 may increase or decrease the linearization quantity when the error calculated as an evaluation value becomes smaller than a predetermined threshold. The degree to which the linearization quantity is changed may be predetermined in the same way as the learning rate, etc. The linearization quantity determination unit 40 may, for example, apply $\gamma$ calculated in Equation 5 below to the error err.

[Math. 5]

$$\gamma = \frac{1}{\text{err}}, \ 0 < \text{err} \leq 1 \quad \text{(Equation 5)}$$

Figure 3:
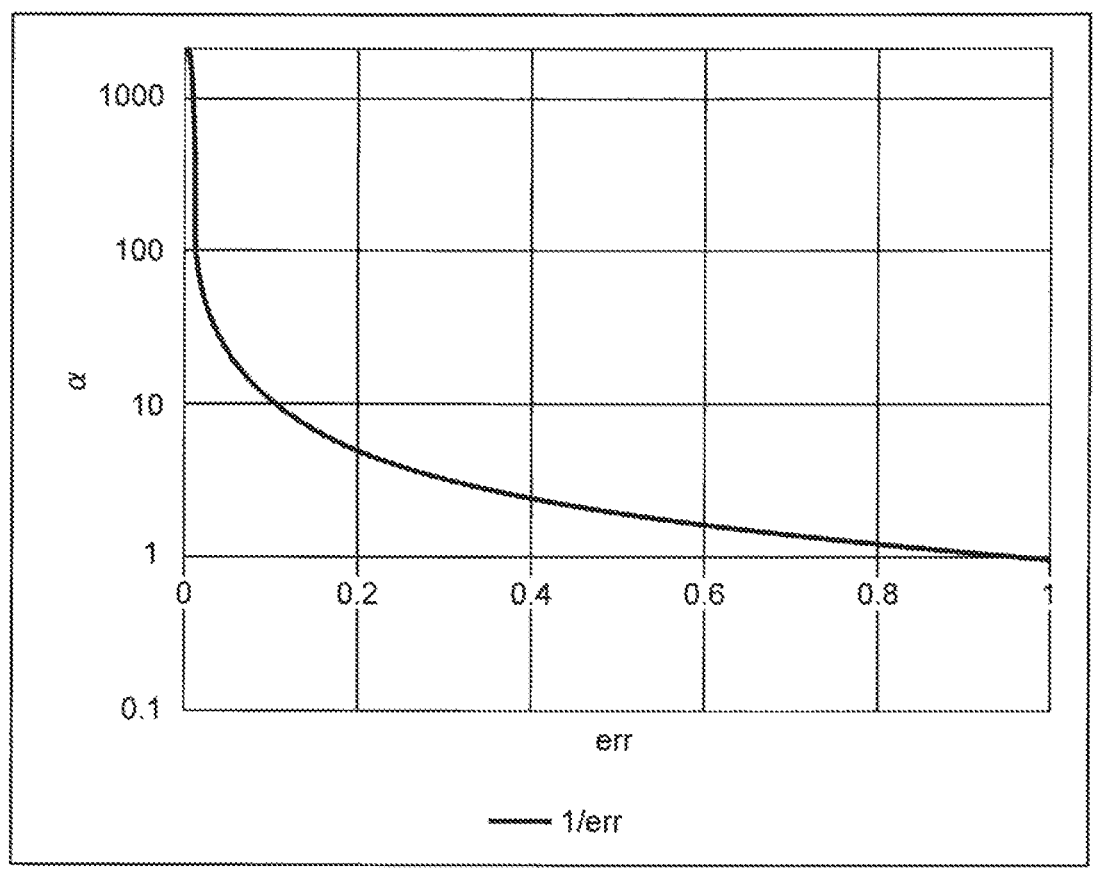
FIG. 3 It depicts an explanatory diagram depicting an example of the degree to which the linearization quantity is increased.

FIG. 3 is an explanatory diagram depicting an example of the degree to which the linearization quantity is increased. The graph illustrated in FIG. 3 is the degree determined by Equation 5 above, and shows that the smaller the error, the larger the linearization quantity is set.

The aggregation unit 50 replaces the activation function that is determined to converge to a linear function by increasing or decreasing the linearization quantity with that linear function. For example, it is supposed that the activation function shown in Equation 3 above is used, and as a result of increasing the linearization quantity $\gamma$ in the learning process, it can be set to $\gamma=\infty$ (infinity) at the end of the learning. In this case, the aggregation unit 50 determines that a linear approximation is possible, and replaces the activation function with a linear function with slope 1, as shown in Equation 6 below.

[Math. 6]

$$\varphi(x)=x \qquad \text{(Equation 6)}$$

The aggregation unit 50 may also determine that a linear approximation is possible and replace it with a linear function when $\gamma$ is equal to or greater than a predetermined threshold (such as $\gamma=16$). In addition, the range that may be regarded as the slope of the linear function to be aggregated for the output of the intermediate layer (hereinafter referred to as the linear approximation range). Then, the aggregation unit 50 may determine that a linear approximation is possible when the slope of the activation function when $\gamma$ is increased is within that range, and replace it with a linear function.

Figure 4:
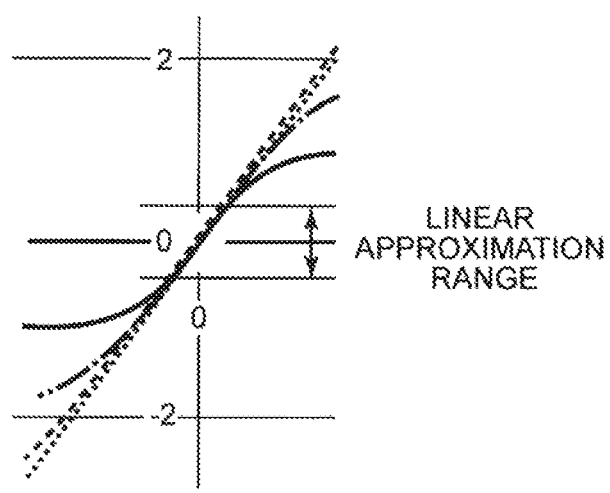
FIG. 4 It depicts an explanatory diagram depicting an example of a range to be set when determining linear approximation.

FIG. 4 is an explanatory diagram depicting an example of a range to be set when determining linear approximation. As illustrated in FIG. 4, a range around the origin may be set, and the aggregation unit 50 may calculate the slope within this range. For example, if the slope of the linear function to be aggregated is 1, slope=0.95 may be set as a range that can be regarded as slope 1, and the aggregation unit 50 may determine that linear approximation is possible when the slope of the activation function when $\gamma$ is increased is 0.95 or more, and replace it with a linear function.

If it is determined that it cannot set $\gamma=\infty$, the aggregation unit 50 may determine that the activation function cannot be replaced by a linear function and stop the aggregation process. In the above explanation, it is described how the linearization quantity $\gamma$ is increased as the error decreases. It may be changed to $\gamma=\infty$ so that the accuracy of inference can be maintained after the learning unit 30 learns with $\gamma=1$.

The aggregation unit 50 then aggregates the weights between the layers that use the replaced linear functions. For example, it is supposed that all of the activation functions used in the neural network illustrated in FIG. 34 can be replaced by linear functions. In this case, the aggregation unit 50 aggregates the weights $W_1$ to $W_5$ illustrated in FIG. 34 into the weights W shown in Equation 7 below.

$$W=W_5W_4W_3W_2W_1 \qquad \text{(Equation 7)}$$

By using the aggregated weights W, the calculation can be performed during inference using Equation 8, which is shown below.

$$\text{Out}=W\cdot\text{In} \qquad \text{(Equation 8)}$$

By aggregating the weights in this way, the aggregation unit 50 makes it possible to reduce the amount of calculation. For example, in the example of Equation 7 shown above, it is possible to reduce the amount of calculation by a factor of five.

The aggregation unit 50 may aggregate not only the weights between all the layers, but also the weights between some of the layers. For example, if only some of the activation functions are replaced with linear functions, the aggregation unit 50 may aggregate only the weights between some of the replaced layers. For example, it is supposed that the activation functions of the input layer, the first layer, and the second layer of the neural network illustrated in FIG. 34 can be replaced with linear functions. In this case, the aggregation unit 50 may aggregate the weights $W_1$ to $W_5$ illustrated in FIG. 34 into the weights $W_{part}$ shown in Equation 9 below.

$$W_{part}=W_3W_2W_1 \qquad \text{(Equation 9)}$$

Figure 5:
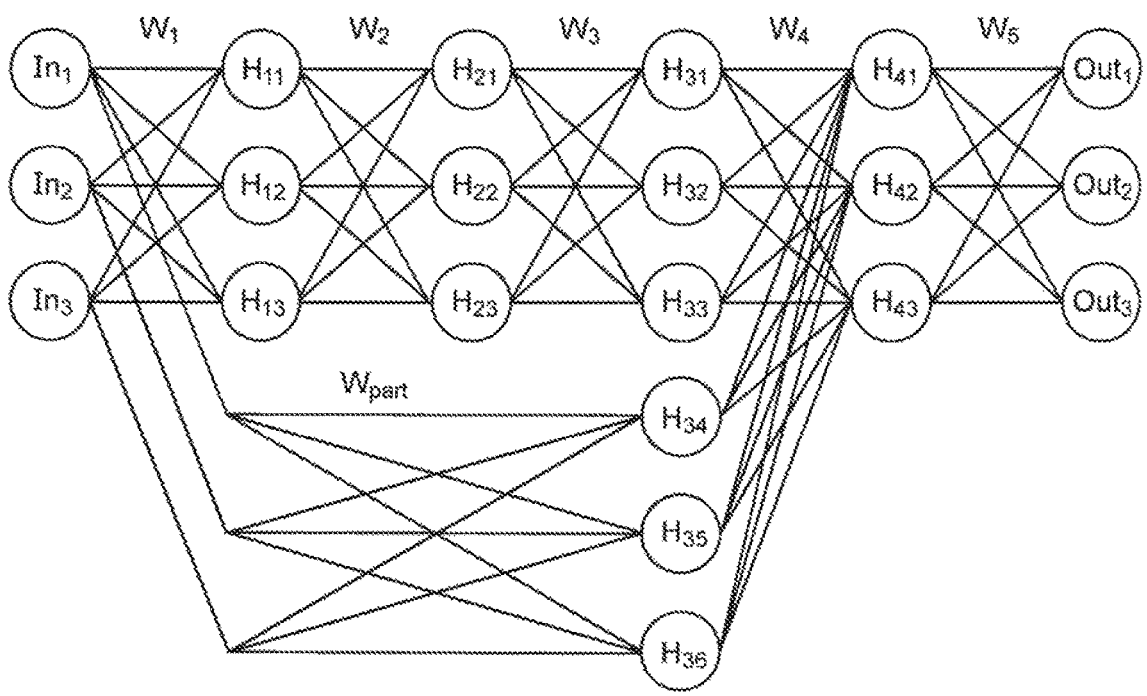
FIG. 5 It depicts an explanatory diagram depicting an example of a neural network with aggregated weights.

FIG. 5 is an explanatory diagram depicting an example of a neural network with aggregated weights. When the weights are aggregated into the neural network illustrated in FIG. 5, the calculation can be performed using Equation 10 shown below during inference by using the partially aggregated weights $W_{part}$.

$$\text{Out}=W_{part}\cdot\text{In} \qquad \text{(Equation 10)}$$

Figure 6:
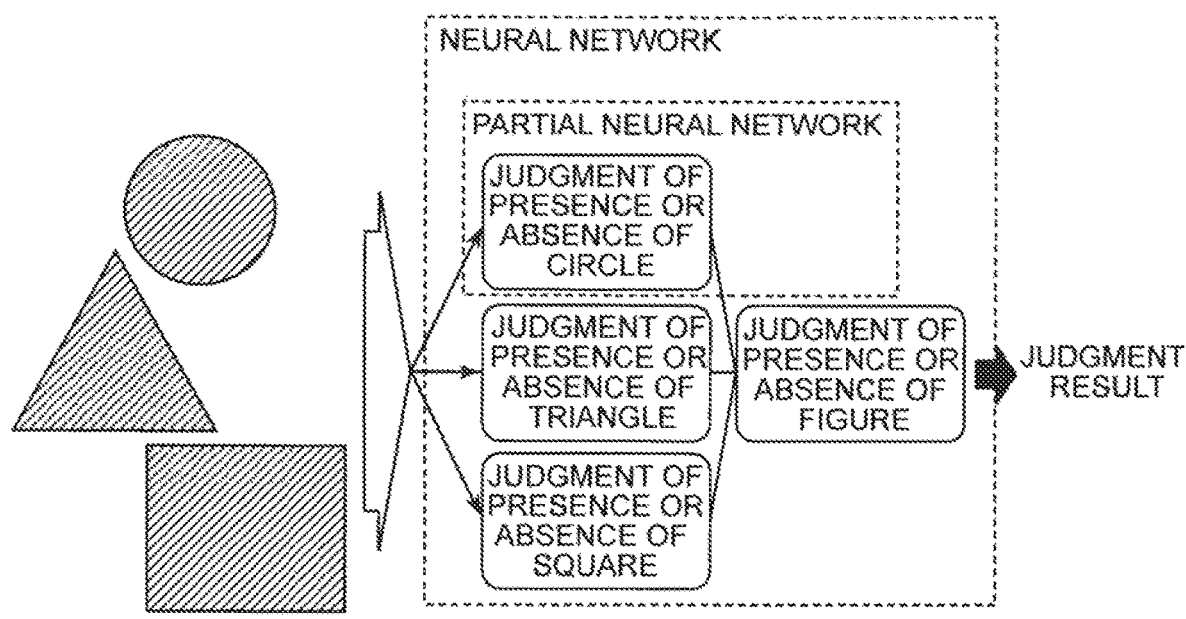
FIG. 6 It depicts an explanatory diagram depicting an example of the process of partially linear approximation of the activation function.

The following is a specific example of a partially linear approximation of the activation function. FIG. 6 is an explanatory diagram depicting an example of the process of partially linearly approximating the activation function. The state in which the activation function can be partially linearly approximated indicates the state in which the structure of some neural networks included in one neural network can be changed. For example, when a structure is designed to partially extract "a certain feature", the structure to extract each feature itself corresponds to a part of the neural network.

For example, assuming the process of classifying circles, triangles, and squares from a certain set of image data, as illustrated in FIG. 6, the judgment of the presence or absence of circles, the presence or absence of triangles, and the presence or absence of squares can be configured in separate network structures. If the final configuration that brings together the outputs of the three types of decision circuits to create a single output is considered to be a single neural network, for example, a situation where only the judgment of the presence or absence of a circle can be linearly approximated corresponds to a situation where a partially linear approximation can be made.

In the above explanation, Scaling Tanh is described as an example of an activation function, but activation functions are not limited to Scaling Tanh. In the following, it is explained some examples of activation functions that approach a linear function by changing the linearization quantity.

A first example of another activation function is Scaling Sigmoid, which is the function represented by Equation 11, shown below, and is approximated by $\varphi(x)=0.25x+0.5$ when $\gamma$ is increased from 1 to $\infty$. The derivative of Equation 11 is expressed in Equation 12 below.

[Math. 7]

$$\varphi(x) = \gamma\left(\frac{1}{1+e^{-\frac{x}{\gamma}}}\right) + 0.5 - \frac{\gamma}{2} \qquad \text{(Equation 11)}$$

$$\varphi(x) = \left(1 - \left(\frac{\varphi(x)}{\gamma} - \frac{1}{2\gamma} + 0.5\right)\right)\left(\frac{\varphi(x)}{\gamma} - \frac{1}{2\gamma} + 0.5\right) \qquad \text{(Equation 12)}$$

Figure 7:
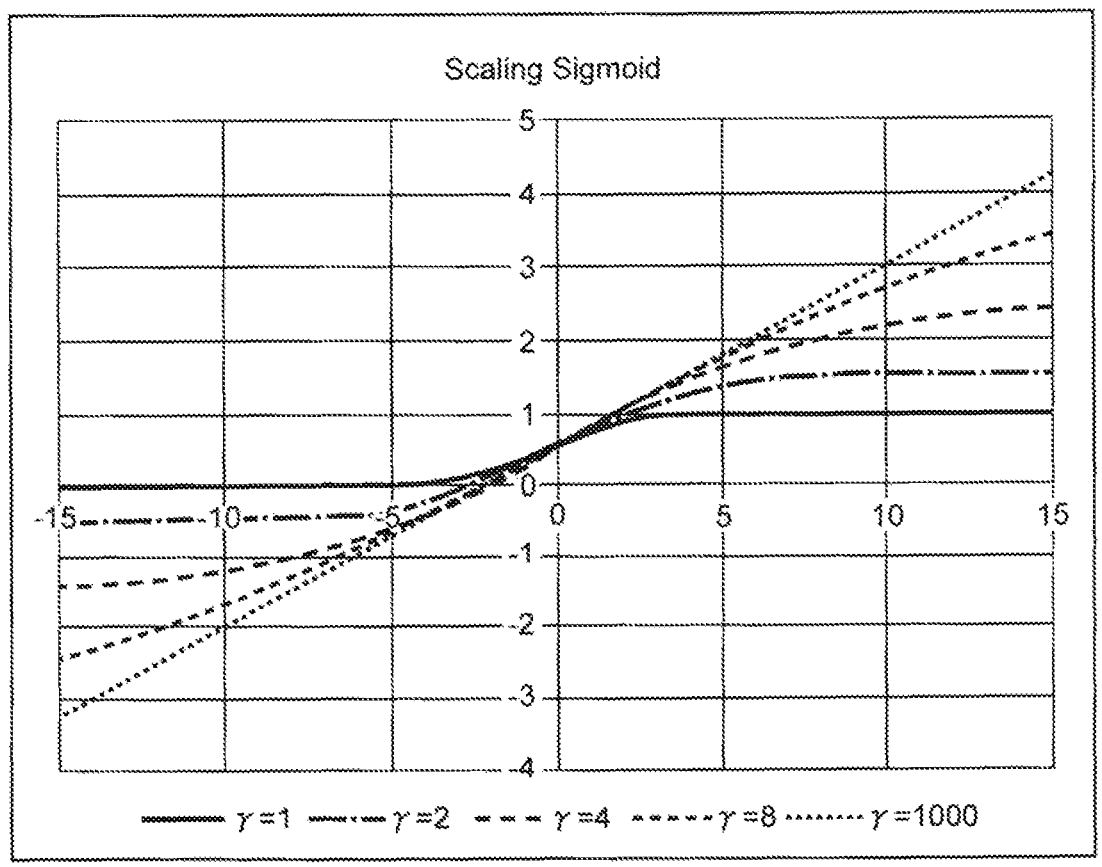
FIG. 7 It depicts an explanatory diagram depicting an example of a change in Scaling Sigmoid.
Figure 8:
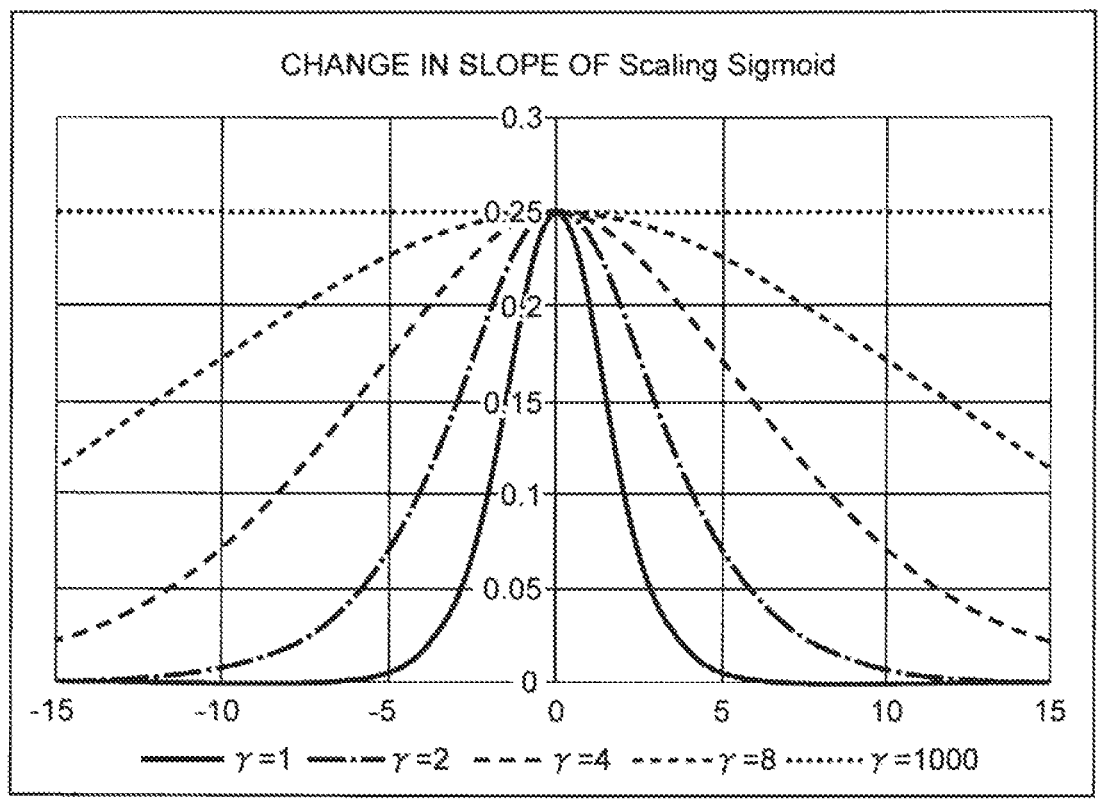
FIG. 8 It depicts an explanatory diagram depicting an example of a change in the slope of Scaling Sigmoid.

FIG. 7 is an explanatory diagram depicting an example of the change in Scaling Sigmoid. FIG. 8 is an explanatory diagram depicting an example of the change in the slope of the Scaling Sigmoid. In FIG. 7, the change in the graph when $\gamma$ is varied from 1 to 1000 is illustrated. As $\gamma$ is increased as illustrated in FIG. 7, the graph illustrated in FIG. 7 is eventually approximated by a straight line with a slope of 0.25 through an intercept of 0.5, as illustrated by the slope in FIG. 8.

A second example of another activation function is Scaling ReLU, which is the function represented by Equation 13, shown below, and which is approximated function when $\gamma$ is decreased from 0 to $-\infty$ by $\varphi(x)=x$. The derivative of Equation 13 is expressed in Equation 14 below.

[Math. 8]

$$\varphi(x)=\max(\gamma,x) \quad \text{(Equation 13)}$$

$$\dot{\varphi}(x)=\varphi(x)>\gamma?1:0 \quad \text{(Equation 14)}$$

Figure 9:
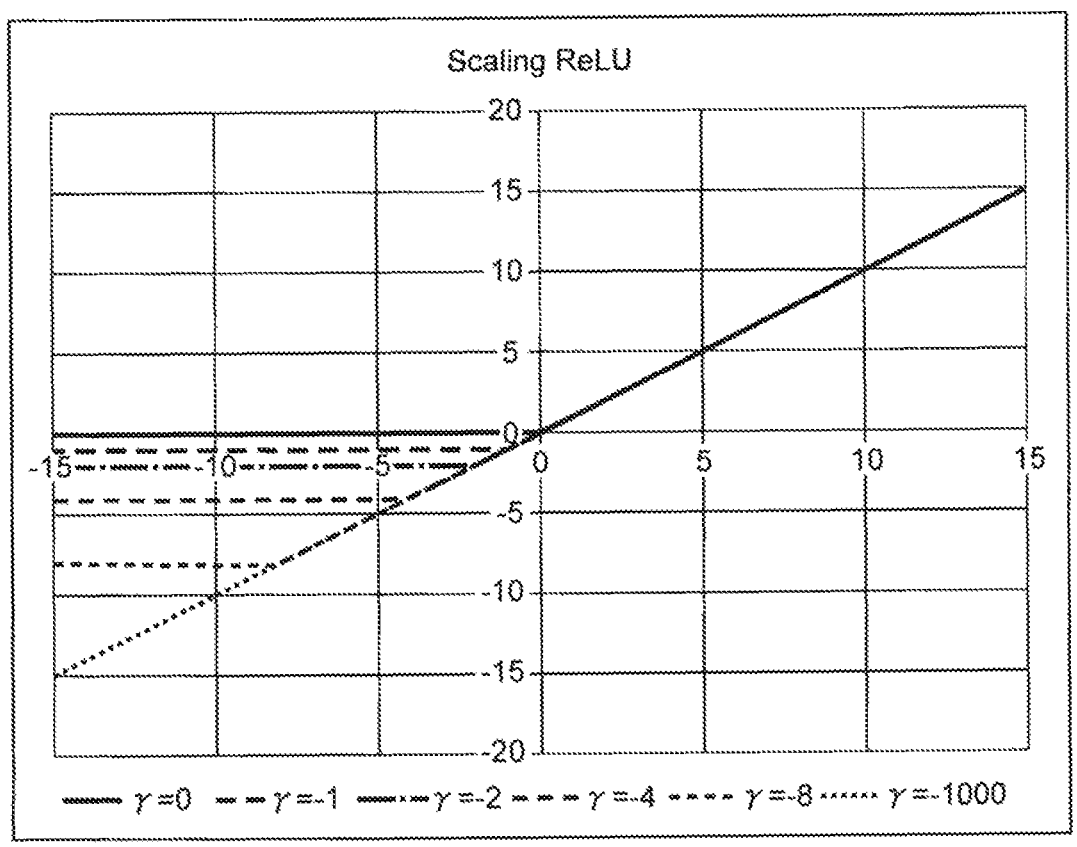
FIG. 9 It depicts an explanatory diagram depicting an example of a change in Scaling ReLU.

FIG. 9 is an explanatory diagram depicting an example of the change in Scaling ReLU. FIG. 9 illustrates the change in the graph when $\gamma$ is varied from 0 to $-1000$. As $\gamma$ is decreased as illustrated in FIG. 9, the graph illustrated in FIG. 9 is eventually approximated by a straight line with slope 1 passing through the origin.

A third example of another activation function is Scaling PReLU, which is the function represented by Equation 15, shown below, and is approximated function by $\varphi(x)=x$ when $\gamma$ is increased from 0 to $(1-\alpha)$ (where $0<\alpha<1$). The derivative of Equation 15 is expressed in Equation 16 below.

[Math. 9]

$$\varphi(x)=x>0?x:(\alpha+\gamma)x \quad \text{(Equation 15)}$$

$$\dot{\varphi}(x)=\varphi(x)>0?1:(\alpha+\gamma) \quad \text{(Equation 16)}$$

Figure 10:
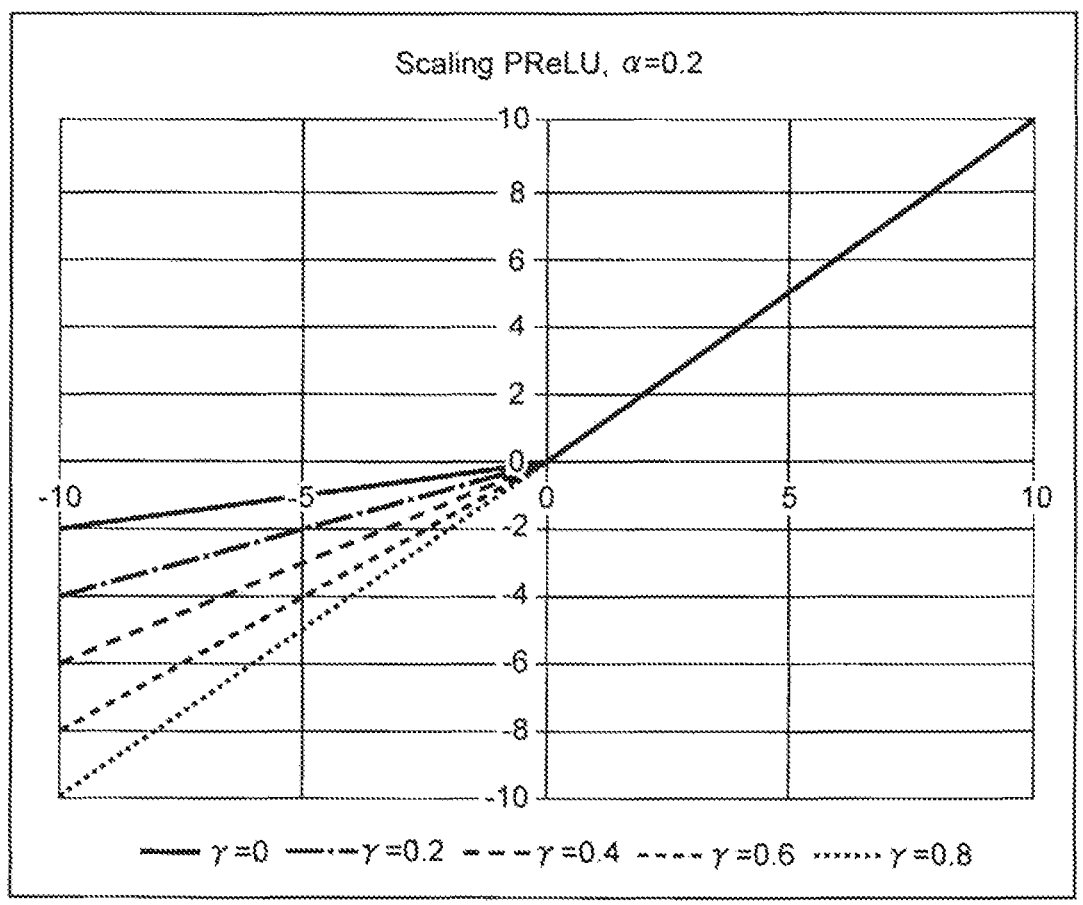
FIG. 10 It depicts an explanatory diagram depicting an example of the change in Scaling PRELU.

FIG. 10 is an explanatory diagram depicting an example of the change in Scaling PReLU. In FIG. 10, the change in the graph is illustrated when $\alpha=0.2$ and $\gamma$ is varied from 0 to 0.8. As $\gamma$ is increased as illustrated in FIG. 10, the graph illustrated in FIG. 10 is eventually approximated by a straight line with slope 1 passing through the origin.

A fourth example of another activation function is Min and Max, which is the function expressed in Equation 17, shown below, and is approximated function by $\varphi(x)=x$ when $\gamma$ is increased from 0 to $\infty$. The derivative of Equation 17 is expressed in Equation 18 below.

[Math. 10]

$$\varphi(x)=\min(\max(-\gamma,x),\gamma) \quad \text{(Equation 17)}$$

$$\dot{\varphi}(x)=x<-\gamma?0:(x>\gamma?0:1) \quad \text{(Equation 18)}$$

Figure 11:
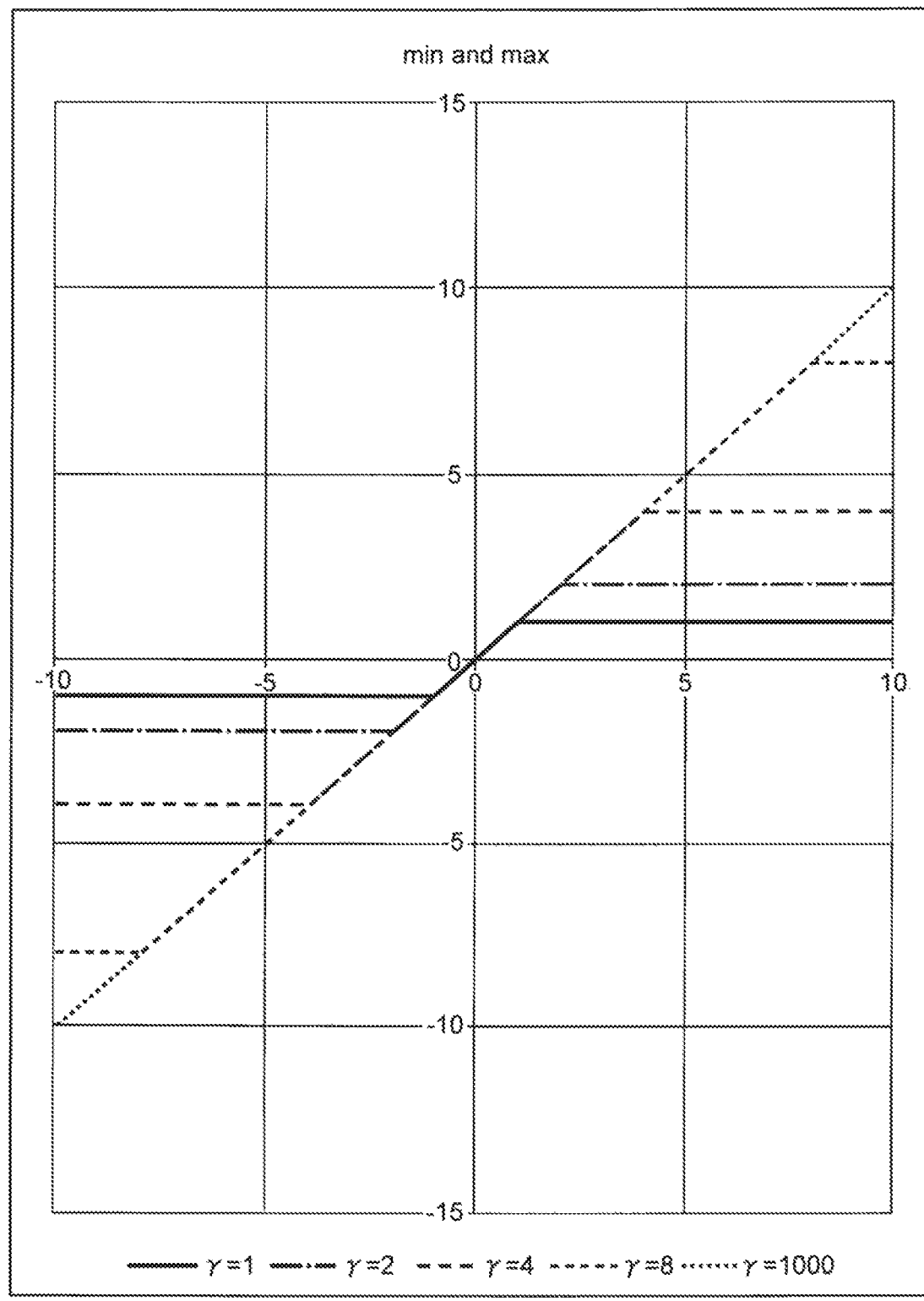
FIG. 11 It depicts an explanatory diagram depicting an example of the change in Min and Max.

FIG. 11 is an explanatory diagram depicting an example of the change in Min and Max. In FIG. 11, the change in the graph is illustrated when $\gamma$ is varied from 1 to 1000. As $\gamma$ is increased as illustrated in FIG. 11, the graph illustrated in FIG. 11 is eventually approximated by a straight line with slope 1 passing through the origin.

Another generalized Scaling Tanh, which is a generalization of the Scaling Tanh described above, may be used as the activation function. The generalized Scaling Tanh is the function expressed in Equation 19, shown below, which is approximated function as $\varphi(x)=\alpha x$ when $\gamma$ is increased from 1 to $\infty$. The derivative of Equation 19 is expressed in Equation 20 below.

[Math. 11]

$$\varphi(x)=\gamma\tanh\left(\alpha\frac{x}{\gamma}\right) \quad \text{(Equation 19)}$$

$$\dot{\varphi}(x)=\alpha\left(1-\left(\frac{\varphi(x)}{\gamma}\right)^2\right) \quad \text{(Equation 20)}$$

Figure 12:
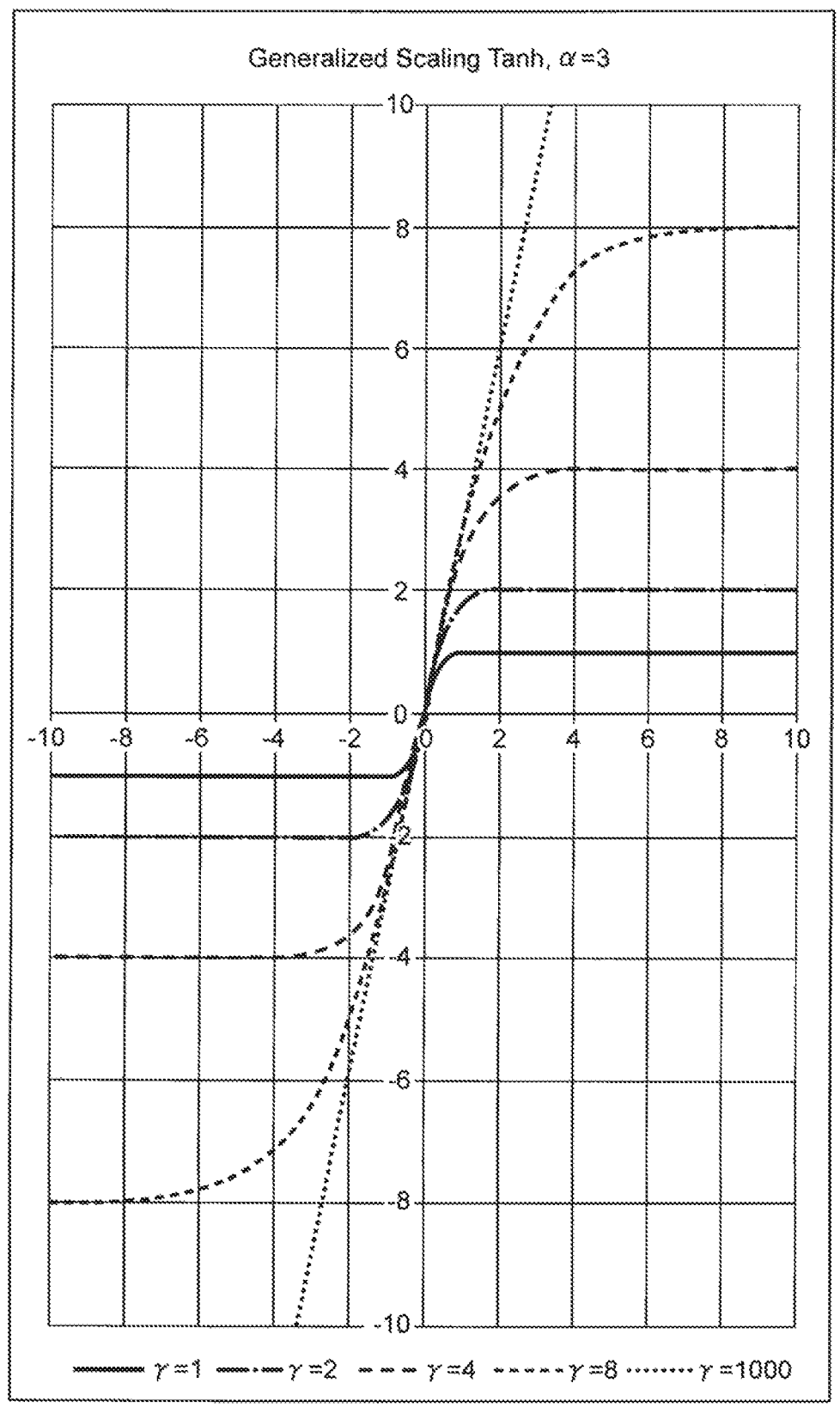
FIG. 12 It depicts an explanatory diagram depicting an example of the change of the generalized Scaling Tanh.
Figure 13:
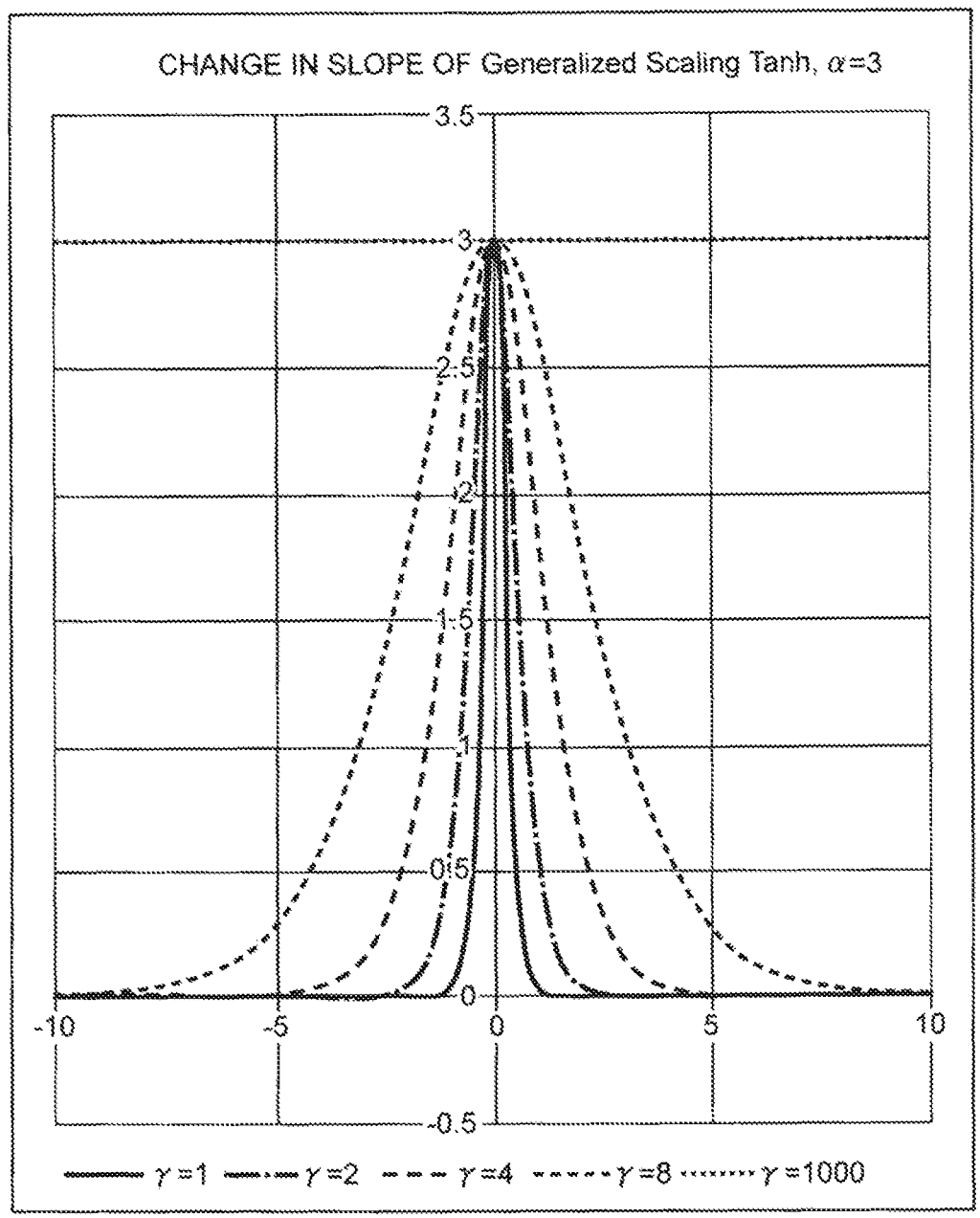
FIG. 13 It depicts an explanatory diagram depicting an example of the change in the slope of the generalized Scaling Tanh.

FIG. 12 is an explanatory diagram depicting an example of the change of the generalized Scaling Tanh. FIG. 13 is an explanatory diagram depicting an example of the change in the slope of the generalized Scaling Tanh. FIG. 12 illustrates the change in the graph when $\alpha=3$ and $\gamma$ is varied from 1 to 1000. As $\gamma$ is increased as illustrated in FIG. 12, the graph illustrated in FIG. 12 is eventually approximated to a straight line with slope $\alpha=3$ passing through the origin, as illustrated by the slope illustrated in FIG. 13.

Thereafter, the above process is repeated until the learning process is completed.

The training data determination unit 20, the learning unit 30, the linearization quantity determination unit 40, and the aggregation unit 50 are realized by a computer processor (e.g., CPU (Central Processing Unit), GPU (Graphics Processing Unit), FPGA (field-programmable gate array)) that operates according to a program (neural network learning program).

For example, a program may be stored in a storage unit (not shown) of the neural network learning device, and the processor may read the program and operate as the training data determination unit 20, the learning unit 30, the linearization quantity determination unit 40, and the aggregation unit 50 according to the program. Also, the functions of the neural network learning device may be provided in Saas (Software as a Service) format.

The training data determination unit 20, the learning unit 30, the linearization quantity determination unit 40, and the aggregation unit 50 may each be realized by dedicated hardware. Some or all of the components of each device may be realized by general-purpose or dedicated circuits, processors, or combinations thereof. These may be configured by a single chip or by multiple chips connected via a bus. Some or all of the components of each device may be realized by a combination of the above-mentioned circuits and programs.

When some or all of the components of the neural network learning device are realized by multiple information processing devices, circuits, etc., the multiple information processing devices, circuits, etc. may be centrally located or distributed. For example, the information processing devices, circuits, etc. may be realized as a client-server system, cloud computing system, etc., each of which is connected via a communication network.

Figure 14:
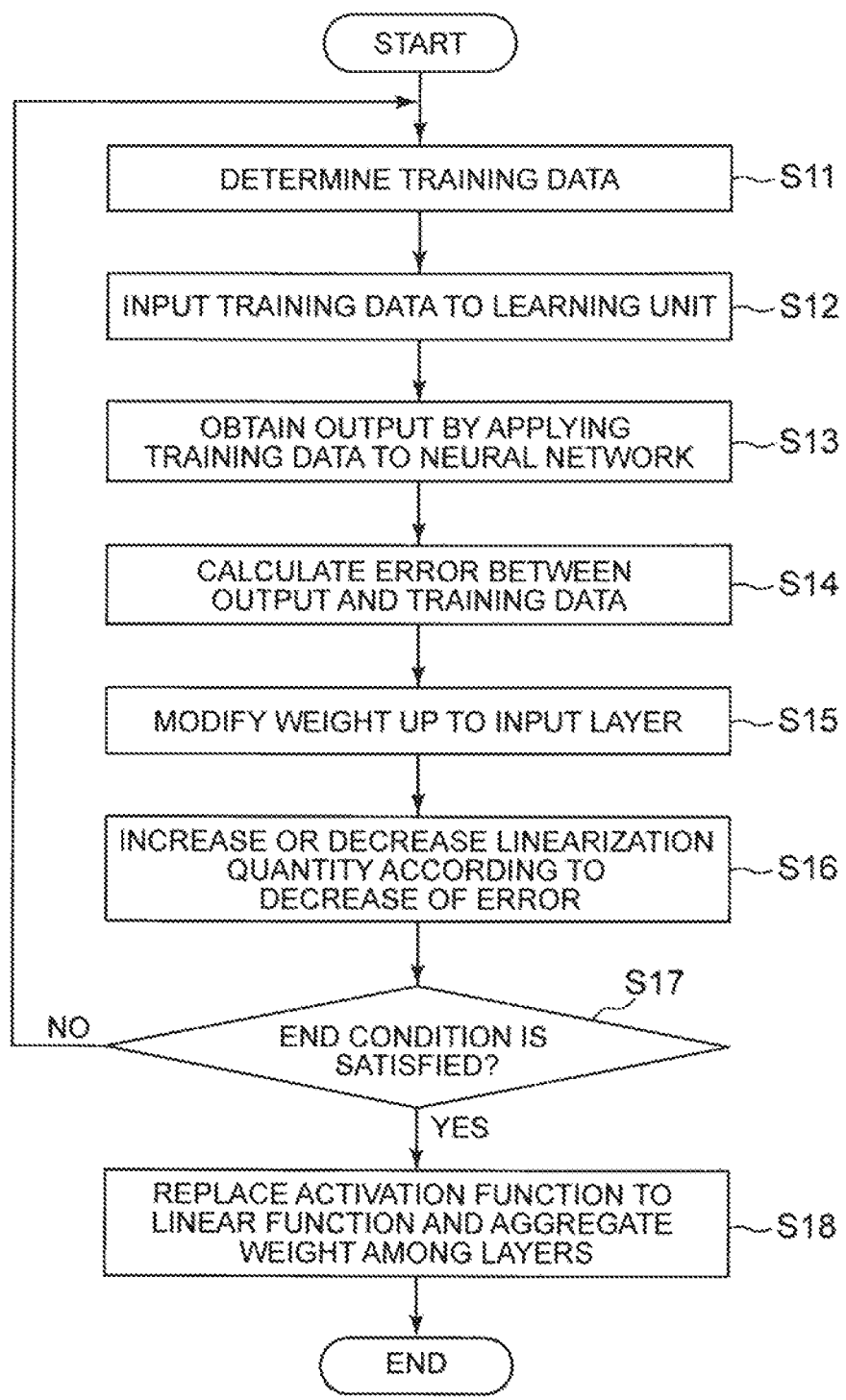
FIG. 14 It depicts a flowchart depicting an example of the operation of the neural network learning device of the first exemplary embodiment.

Next, the operation of the neural network learning device of this exemplary embodiment will be described. FIG. 14 is a flowchart depicting an example of the operation of the neural network learning device of this exemplary embodiment. The training data determination unit 20 determines the training data from the training data set stored in the training data storage unit 10 (Step S11) and inputs it to the learning unit 30 as input data (Step S12). The learning unit 30 obtains the output by applying the input training data to the (multilayer) neural network (Step S13), and calculates the error between the output and the training data (Step S14).

The learning unit 30 propagates the error from the output to the input direction and modifies the weights up to the input layer (Step S15). Meanwhile, the linearization quantity determination unit 40 increases or decreases the linearization quantity according to the decrease of the error (Step S16). The aggregation unit 50 determines whether the end condition of the learning process is satisfied (Step S17). The end condition is arbitrary and can be, for example, a predetermined number of times or time. If the end condition is not satisfied (No in step S17), the process from step S11 onward is repeated.

On the other hand, if the end condition is satisfied (Yes in step S17), the aggregation unit 50 replaces the activation function that is determined to converge to a linear function with that linear function and aggregates the weights among the layers using the replaced linear function (Step S18).

As described above, in the present explanatory embodiment, the learning unit 30 calculates an evaluation value (specifically, an error) based on the output by the neural network in learning the neural network, and the linearization quantity determination unit 40 changes the linearization quantity when the evaluation value satisfies a predetermined criterion. Specifically, the linearization quantity determination unit 40 increases or decreases the linearization quantity in accordance with the decrease in the error. Then, the aggregation unit 50 replaces the activation function that is determined to converge to a linear function by increasing or decreasing the linearization quantity with that linear function, and aggregates the weights among the layers using the replaced linear function. Thus, it is possible to learn a neural network so as to reduce the amount of computation.

For example, in the learning of general neural networks such as those described in Patent Literature 1, the learning rate is adjusted to find the optimal solution, but there was no technical idea of changing the predetermined nonlinear activation function. On the other hand, in the present explanatory embodiment, the learning unit 30 uses an activation function that can be scaled up or down in the learning process of the multilayer neural network, and transforms the activation function into a linear function during the learning process. In other words, an activation function that can make the original nonlinear function closer to a linear function or return to the original nonlinear function by changing the parameters is used. This makes it possible to determine whether the learning target is linearly separable or not.

Figure 15:
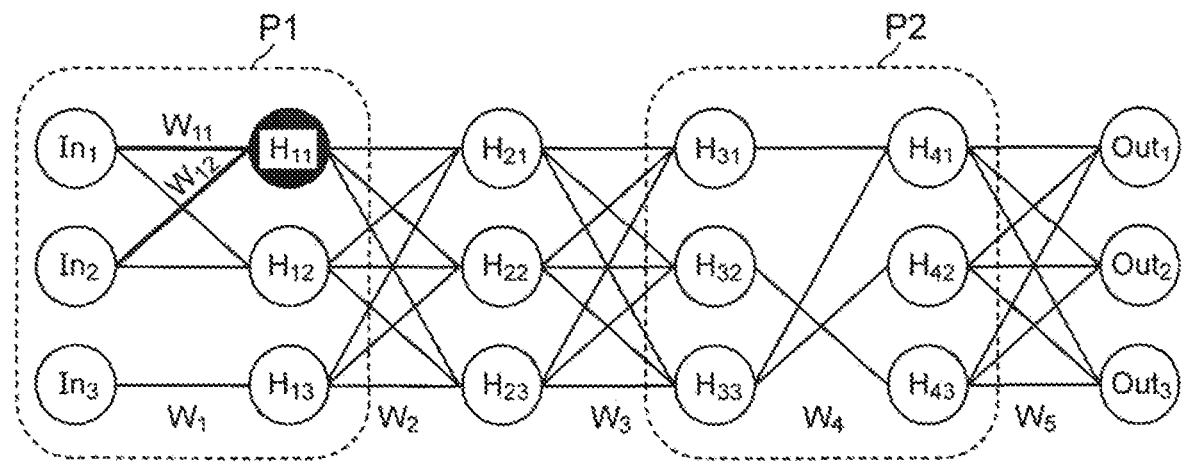
FIG. 15 It depicts an explanatory diagram depicting an example of a neural network with aggregated weights.

FIG. 15 is an explanatory diagram depicting an example of a neural network with aggregated weights. For example, it is supposed that for the neural network illustrated in FIG. 34, the weight of $W_1$ is represented by the matrix shown in Equation 21 below as a result of learning with increasing or decreasing the quantity of linearization. In this case, the matrix shown in Equation 21 below can be transformed into two (matrix) equations shown in Equation 22. Therefore, the aggregation unit 50 may construct a neural network with the weights aggregated as shown in part P1 of FIG. 15.

[Math. 12]

$$W_1 = \begin{pmatrix} w_{11} & w_{12} & w_{13}=0 \\ w_{21} & w_{22} & w_{23}=0 \\ w_{31}=0 & w_{32}=0 & w_{33} \end{pmatrix} \quad \text{(Equation 21)}$$

$$W_{1a} = \begin{pmatrix} w_{11} & w_{12} \\ w_{21} & w_{22} \end{pmatrix}, W_{1b} = w_{33} \quad \text{(Equation 22)}$$

Also, it is supposed that $w_{12}$, $w_{13}$, $w_{21}$, $w_{22}$, $w_{31}$, and $w_{33}$ are sufficiently small for the weights of $W_4$. In this case, the aggregation unit 50 may construct the neural network by deleting the connection relations, so-called branch trimming, as shown in part P2 of FIG. 15.

Next, we will explain a variant of the neural network learning device of this exemplary embodiment. In the above exemplary embodiment, the linearization quantity determination unit 40 increased or decreased the linearization quantity according to the decrease in the error. The linearization quantity determination unit 40 may further consider the output of the intermediate layer as a condition for increasing or decreasing the linearization quantity. Specifically, in addition to decreasing the error, the linearization quantity determination unit 40 may increase or decrease the linearization quantity when the output of the intermediate layer is in a range (i.e., a linear approximation range) set as that which can be regarded as the slope of the linear function to be aggregated.

Exemplary Embodiment 2

Next, a second exemplary embodiment of the neural network learning device according to the present invention will be described. In the first exemplary embodiment, a method of increasing or decreasing the quantity of linearization based on the error calculated by the learning unit 40 as an evaluation value is described. In this exemplary embodiment, it is described a method of changing the linearization quantity using the judgment accuracy of the output by the verification data as the evaluation value.

Figure 16:
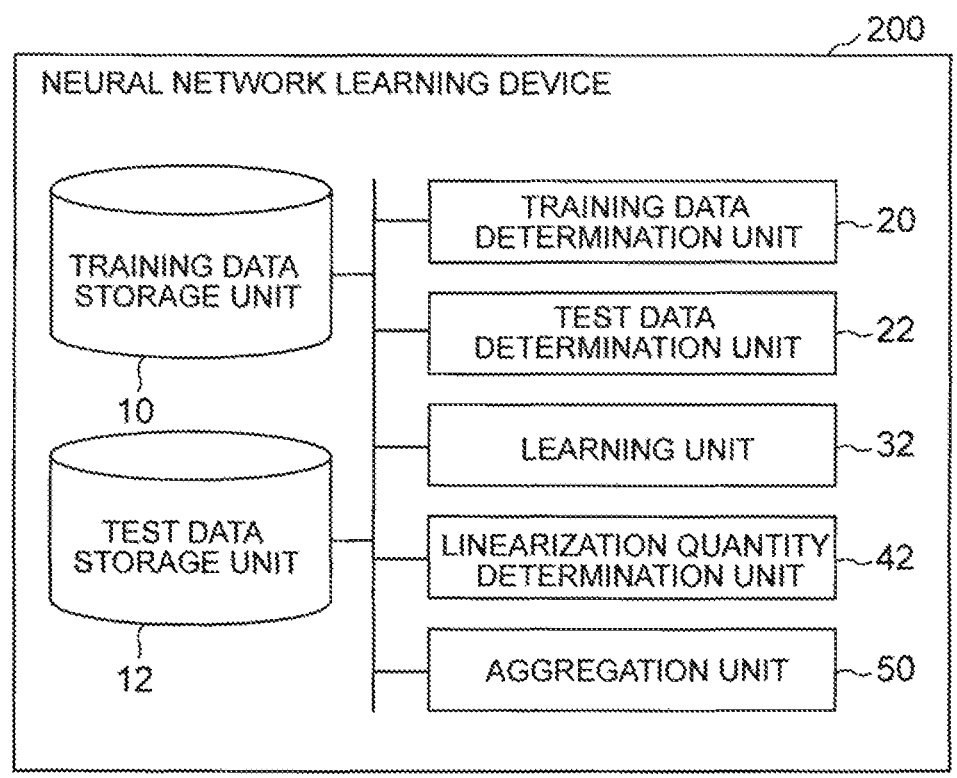
FIG. 16 It depicts a block diagram depicting an example of structure of a second exemplary embodiment of a neural network learning device according to the present invention.

FIG. 16 is a block diagram depicting an example of structure of a second exemplary embodiment of a neural network learning device according to the present invention. The neural network learning device 200 of this exemplary embodiment has a training data storage unit 10, a test data storage unit 12, a training data determination unit 20, a test data determination unit 22, a learning unit 32, a linearization quantity determination unit 42, and an aggregation unit 50.

That is, the neural network learning device 200 of this exemplary embodiment differs from the neural network learning device 100 of the first embodiment in that, compared with the neural network learning device 100 of the first exemplary embodiment, it is further provided with a test data storage unit 12 and a test data determination unit 22, and instead of a learning unit 30 and a linearization quantity determination unit 40, it is provided with a learning unit 32 and a linearization quantity determination unit 42, respectively.

The test data storage unit 12 stores test data with a correct answer label that are used by the learning unit 32, described below, in calculating the judgment accuracy of the neural network. The test data storage unit 12 is realized by, for example, a magnetic disk.

The test data determination unit 22 obtains test data from the test data storage unit 12 and inputs it to the learning unit 32. The method by which the test data determination unit 22 determines the test data to be obtained is arbitrary. The test data determination unit 22 may also identify the test data used for evaluation by the learning unit 32 described below.

The learning unit 32 learns the neural network using the training data input by the training data determination unit 20, using the same method as in the first exemplary embodiment. Furthermore, in this exemplary embodiment, the learning unit 32 inputs the input test data to the (multilayer) neural network and obtains the output. Then, the learning unit 32 calculates the judgment accuracy based on the output and the correct answer labels of the test data.

Specifically, the learning unit 32 calculates the judgment accuracy when test data with the correct answer label is input to the neural network. The method of calculating the judgment accuracy is arbitrary. For example, a widely known method such as the method of calculating the percentage of correct answers can be used.

The linearization quantity determination unit 42 increases or decreases the linearization quantity according to the increase in the calculated judgment accuracy. For example, the linearization quantity determination unit 42 may increase or decrease the linearization quantity when the judgment accuracy calculated as an evaluation value reaches a target value (higher than a predetermined threshold value). The degree to which the linearization quantity is changed may be predetermined in the same way as in the first exemplary embodiment.

Similar to the first exemplary embodiment, the aggregation unit 50 replaces the activation function that is determined to converge to a linear function by increasing or decreasing the linearization quantity with that linear function and aggregates the weights among the layers using the replaced linear function.

Thereafter, the above process is repeated until the learning process is completed. The linearization quantity determination unit 42 may update the linearization quantity each time training data is input, or each time learning with multiple training data is performed.

The training data determination unit 20, the test data determination unit 22, the learning unit 32, the linearization quantity determination unit 42, and the aggregation unit 50 are realized by a computer processor that operates according to a program (neural network learning program).

Figure 17:
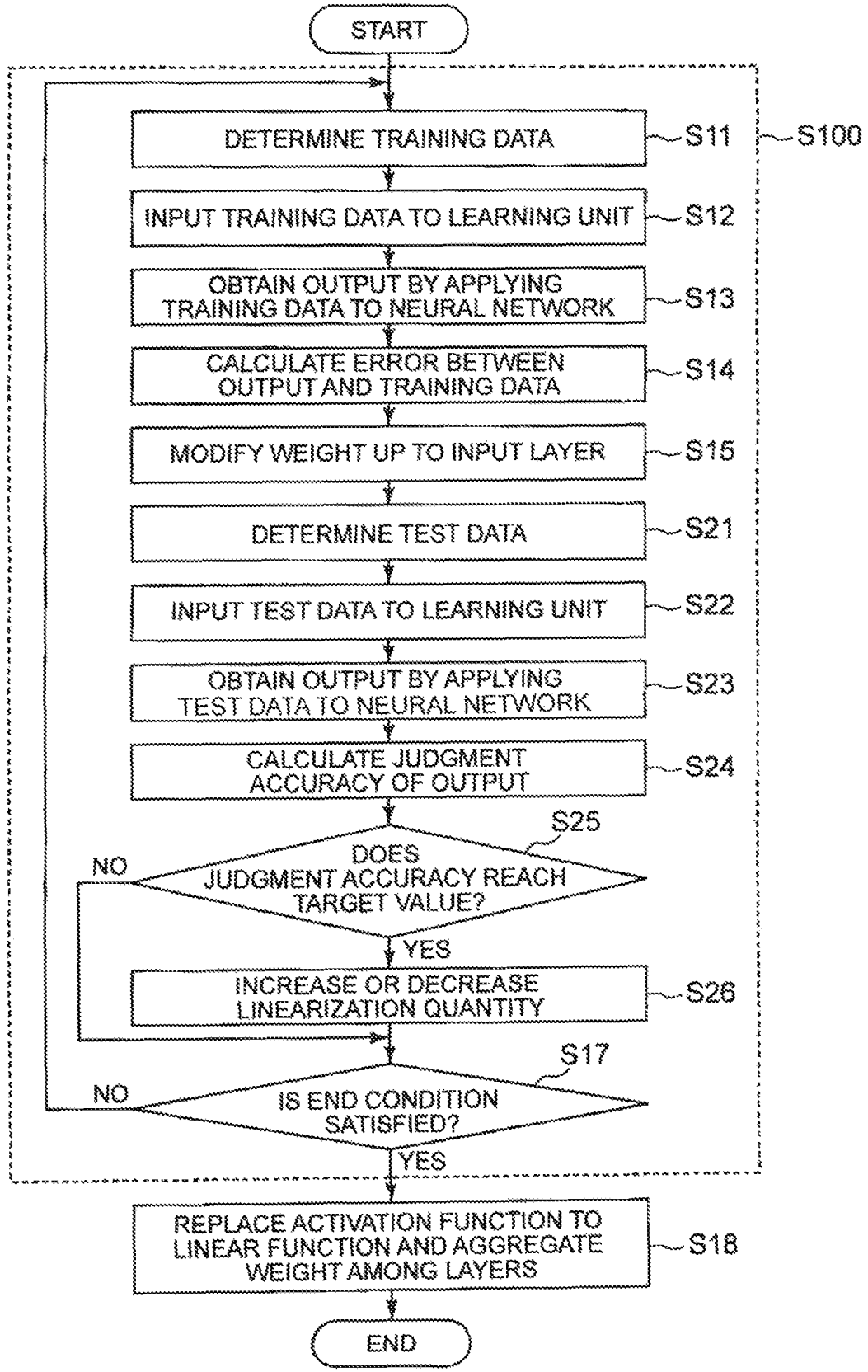
FIG. 17 It depicts a flowchart depicting an example of the operation of the neural network learning device of the second exemplary embodiment.

Next, the operation of the neural network learning device of this exemplary embodiment will be described. FIG. 17 is a flowchart depicting an example of the operation of the neural network learning device of this exemplary embodiment. The process from step S11 to step S15 of inputting the training data and modifying the weights is the same as the process illustrated in FIG. 14.

The test data determination unit 22 determines test data from the test data set stored in the test data storage unit 12 (Step S21), and inputs it as input data to the learning unit 32 (Step S22). The learning unit 32 obtains an output by applying the input test data to a (multilayer) neural network (Step S23), and calculates the correct answer rate (judgment accuracy) based on the output and the test data (Step S24).

The linearization quantity determination unit 42 determines whether the judgment accuracy has reached the target value (Step S25). If the judgment accuracy has reached the target value (Yes in Step S25), the linearization quantity determination unit 42 increases or decreases the linearization quantity γ (Step S26). On the other hand, if the judgment accuracy has not reached the target value (No in step S25), the linearization quantity γ is not changed and the process is continued.

Thereafter, the process of Step S17 and Step S18, in which the aggregation unit 50 determines the end condition of the learning process and replaces the activation function with a linear function, is similar to the process illustrated in FIG. 14.

As described above, in this exemplary embodiment, the learning unit 32 calculates the judgment accuracy when the labeled test data is input to the neural network, and the linearization quantity determination unit 42 increases or decreases the linearization quantity according to the increase in the judgment accuracy. Thus, as in the first exemplary embodiment, it is possible to learn a neural network so as to reduce the amount of computation.

In the first exemplary embodiment, it is explained how the learning unit 30 calculates the error as the evaluation value, and in the second exemplary embodiment, it is explained how the learning unit 32 calculates the judgment accuracy as the evaluation value. Alternatively, the learning unit may use the number of times the learning result is output as the evaluation value.

Exemplary Embodiment 3

Next, it is described a third exemplary embodiment of the neural network learning device according to the present invention. In the first and second exemplary embodiments, the linearization quantity is changed based on the error and judgment accuracy. On the other hand, if the activation function is updated by changing the linearization quantity, an increase in the error and a decrease in the judgment accuracy are assumed due to the influence of data that cannot be linearly separated.

Figure 18:
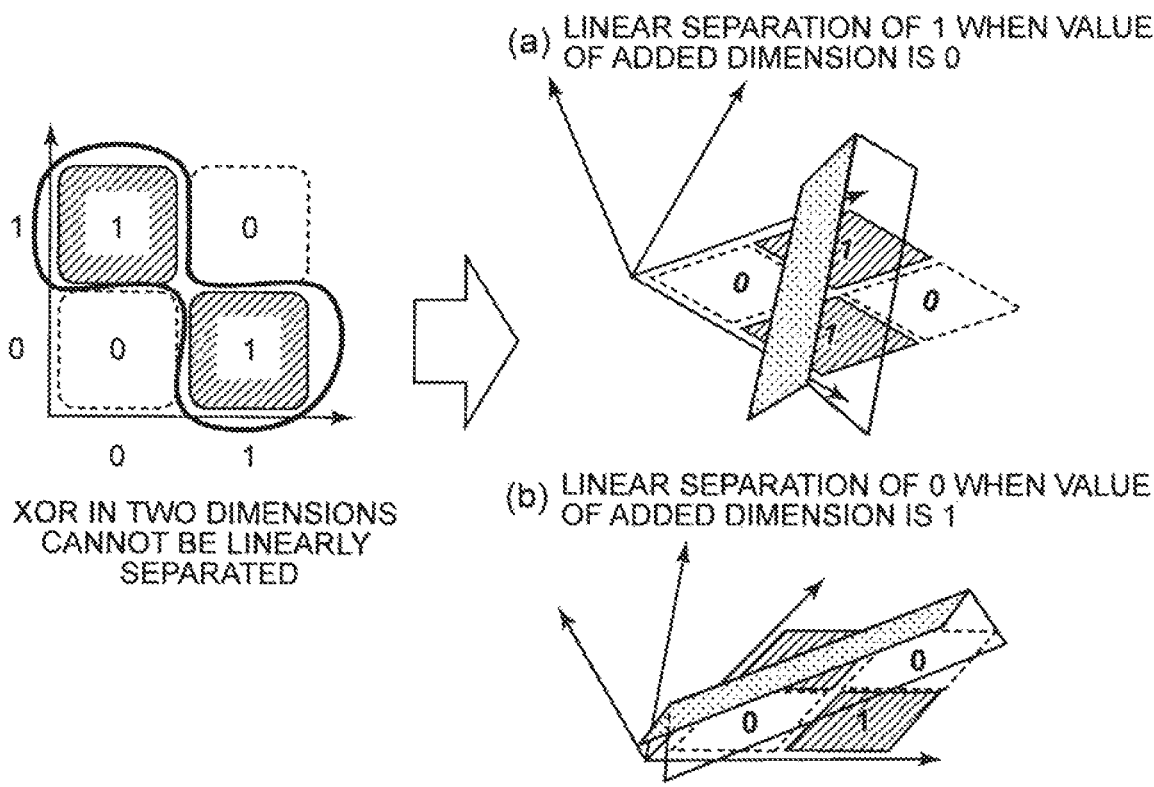
FIG. 18 It depicts an explanatory diagram depicting an example of linear separation when the input dimension is increased.

On the other hand, it is known that even a set of data that cannot be linearly separated can be linearly separated by increasing the input dimension of the data. FIG. 18 shows an example of linear separation when the input dimension is increased. FIG. 18 is an explanatory diagram depicting an example of linear separation when the input dimension is increased. As illustrated in FIG. 18, XOR (exclusive or) in two dimensions cannot be linearly separated. On the other hand, if the input dimension is increased to four dimensions and the value of the data in the increased dimension is set to 0 (or 1), the XOR can be linearly separated using a three-dimensional linear space. The separation illustrated in FIG. 18(*a*) is an example of linear separation of 1 when the value of the added dimension is 0, and the separation illustrated in FIG. 18(*b*) is an example of linear separation of 0 when the value of the added dimension is 1.

Figure 19:
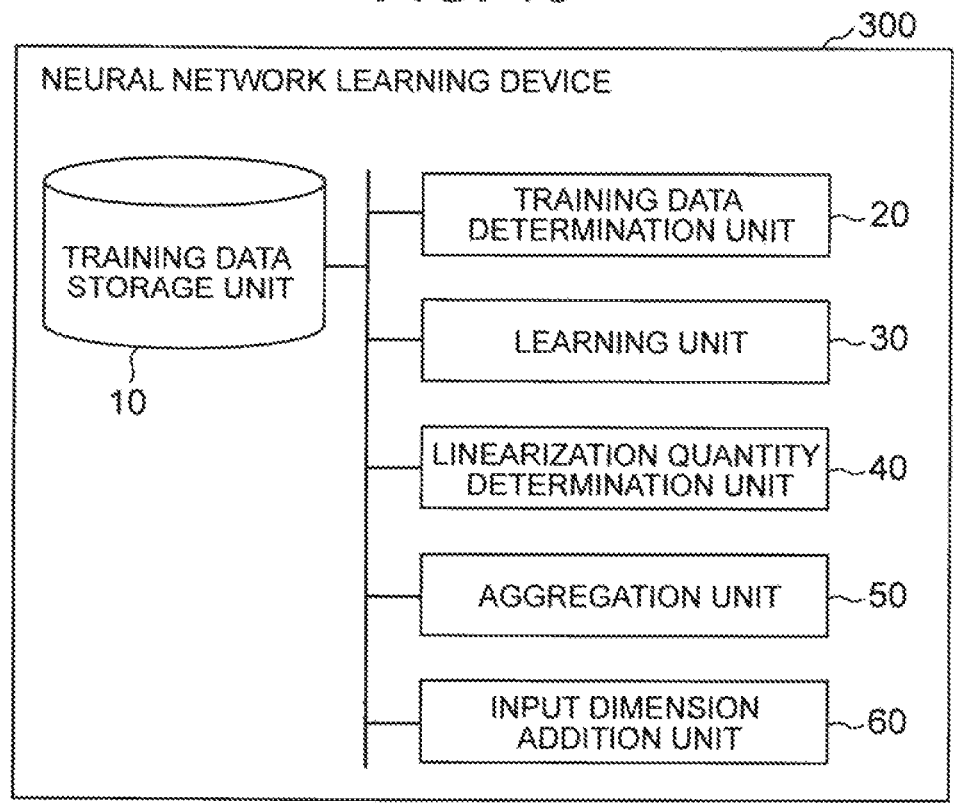
FIG. 19 It depicts a block diagram depicting an example of structure of a third exemplary embodiment of a neural network learning device according to the present invention.

Therefore, in this exemplary embodiment, it is explained how to modify the training data according to the change in the linearization quantity. FIG. 19 is a block diagram depicting an example of structure of a third exemplary embodiment of a neural network learning device according to the present invention. The neural network learning device 300 of this exemplary embodiment has a training data storage unit 10, a training data determination unit 20, a learning unit 30, a linearization quantity determination unit 40, an aggregation unit 50, and an input dimension addition unit 60.

In other words, the neural network learning device 300 of this exemplary embodiment differs from the neural network learning device 100 of the first exemplary embodiment in that it is further equipped with the input dimension addition unit 60.

If the evaluation value worsens after the linearization quantity is changed, the input dimension addition unit 60 adds values to the training data so as to increase the number of dimensions, and modifies structure of the neural network so as to increase the number of dimensions of the input layer of the neural network. Specifically, if the error becomes large after increasing or decreasing the quantity of linearization, the input dimension addition unit 60 adds the training data to the n training data (e.g., $[I_{n1}, \ldots, I_{ni}, Out_1, \ldots, Out_j]$) with the input dimension increased by one dimension (e.g., $[I_{n1}, \ldots, I_{ni}, I_{ni+1}, Out_1, \ldots, Out_j] = [I_{n1}, \ldots, I_{ni}, 1, 1, \ldots, 1]$). Then, the input dimension addition unit 60 modifies the structure of the multilayer neural network so that the input dimension is increased by one.

Thereafter, the process by the learning unit 30 is repeated using the training data with the input dimension increased. The neural network learning device 200 of the second exemplary embodiment may be further configured to have the input dimension addition unit 60 of this exemplary embodiment. In this case, when the judgment accuracy becomes worse after increasing or decreasing the linearization quantity, the input dimension addition unit 60 may add training data with the input dimension increased by one dimension to the n training data, and modify the structure of the multilayer neural network so that the input dimension is increased by one.

The training data determination unit 20, the learning unit 30, the linearization quantity determination unit 40, the aggregation unit 50, and the input dimension addition unit 60 are realized by a computer processor that operates according to a program (neural network learning program).

Figure 20:
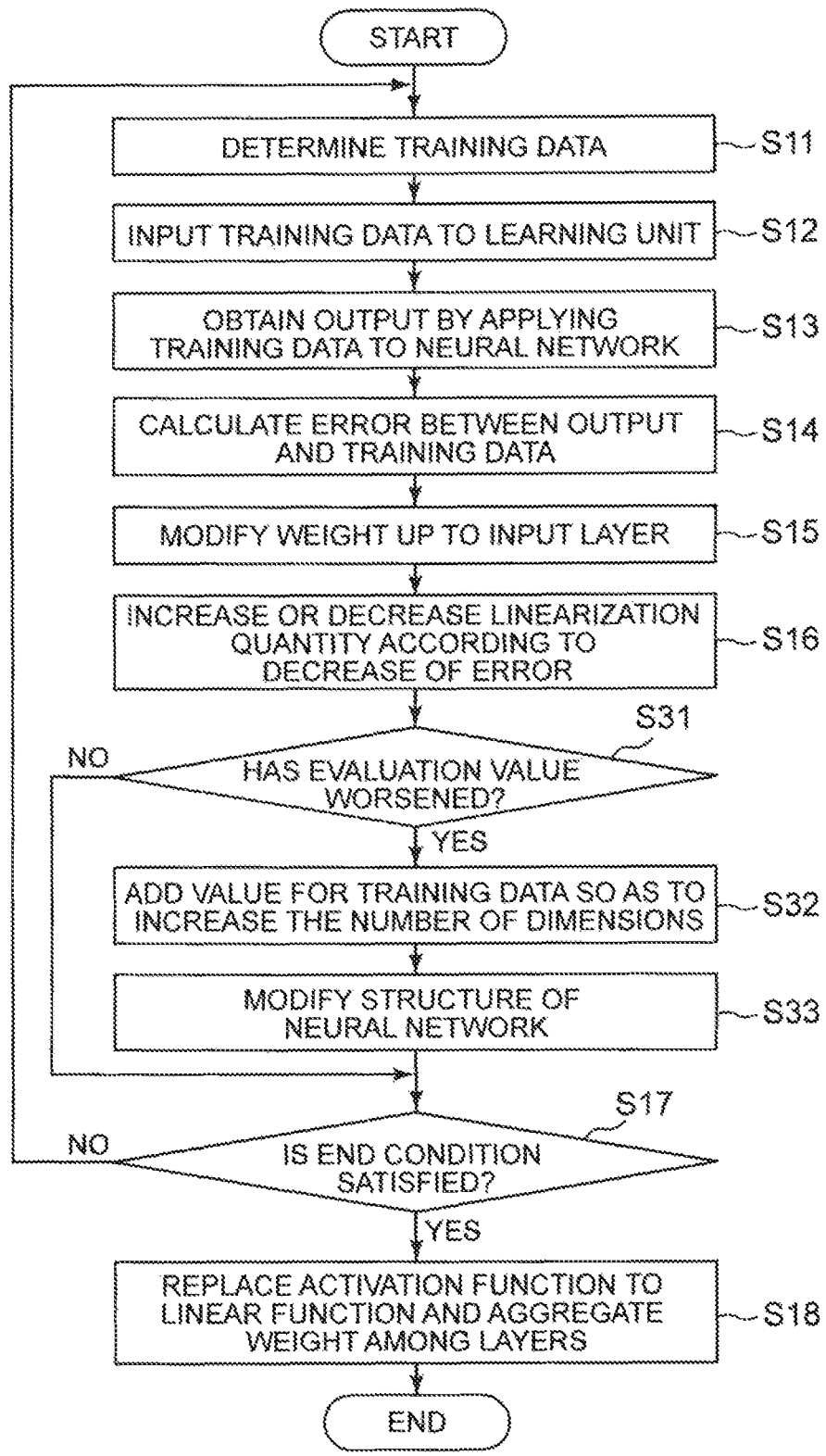
FIG. 20 It depicts a flowchart depicting an example of the operation of the neural network learning device of the third exemplary embodiment.

Next, the operation of the neural network learning device of this exemplary embodiment will be described. FIG. 20 is a flowchart depicting an example of the operation of the neural network learning device of this exemplary embodiment. The process from step S11 to step S16 of inputting the training data, modifying the weights, and changing the linearization quantity is the same as the process illustrated in FIG. 14.

The input dimension addition unit 60 determines whether the evaluation value has worsened after the linearization quantity has been changed (Step S31). For example, the input dimension addition unit 60 determines whether the error has become larger or not, and whether the judgment accuracy has become worse or not. If the evaluation value has worsened (Yes in step S31), the input dimension addition unit 60 adds values for the training data so as to increase the number of dimensions (step S32). Furthermore, the input dimension addition unit 60 modifies the structure of the neural network so as to increase the number of dimensions of the input layer of the neural network (Step S33).

On the other hand, if the evaluation value has not worsened (No in step S31), the process from step S17 is carried out without changing the data, etc. Thereafter, the process of Step S17 and Step S18 in which the aggregation unit 50 determines the end condition of the learning process and replaces the activation function with a linear function is the same as the process illustrated in FIG. 14.

As described above, in the present exemplary embodiment, when the evaluation value worsens after the linearization quantity is changed, the input dimension addition unit 60 adds values to the training data so as to increase the number of dimensions, and modifies the structure of the neural network so as to increase the number of dimensions of the input layer of the neural network. Thus, in addition to the effects of the first or second exemplary embodiment, it is possible to increase the range of possible linear separations.

Exemplary Embodiment 4

Next, it is described a fourth exemplary embodiment of the neural network learning device according to the present invention. In the above exemplary embodiment, it is explained how to increase or decrease the linearization quantity so as to approximate the activation function from a non-linear function to a linear function. In this exemplary embodiment, it is explained a method of setting the linearization quantity to a value that can approximate a linear function in advance, and learning while judging the presence or absence of linearity.

Figure 21:
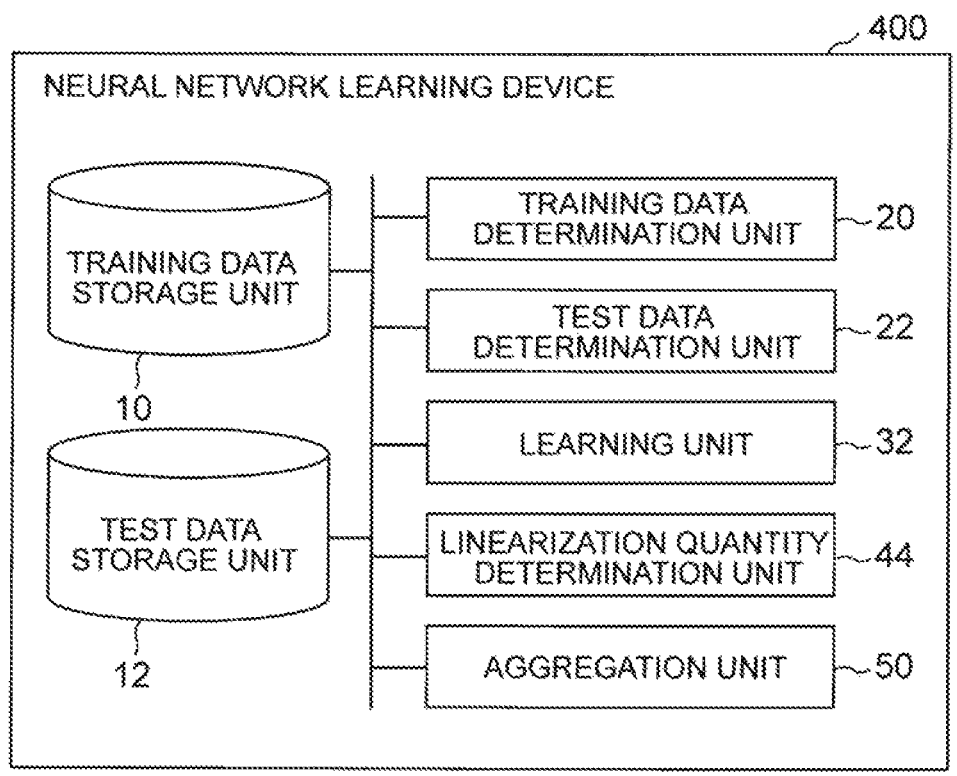
FIG. 21 It depicts a block diagram depicting an example of the structure of a fourth exemplary embodiment of a neural network learning device according to the present invention.

FIG. 21 is a block diagram depicting an example of a fourth exemplary embodiment of a neural network learning device according to the present invention. The neural network learning device 400 of this exemplary embodiment has a training data storage unit 10, a test data storage unit 12, a training data determination unit 20, a test data determination unit 22, a learning unit 32, a linearization quantity determination unit 44, and an aggregation unit 50. In other words, the neural network learning device 400 of this exemplary embodiment differs from the neural network learning device 200 of the second exemplary embodiment in that it has a linearization quantity determination unit 44 instead of a linearization quantity determination unit 42. It should be noted that the neural network learning device 400 of this exemplary embodiment may be equipped with an input dimension addition unit 60.

The linearization quantity determination unit 44 sets the linearization quantity to a value that can approximate the activation function to a linear function before learning by the learning unit 32. For example, when Scaling Tanh shown in Equation 3 above is used as the activation function, the linearization quantity determination unit 44 sets $\gamma$ to a very large value (e.g., $\gamma=1000$). By setting it in this way, the learning process can be performed with the activation function regarded as a linear function in the initial state of learning.

Thereafter, the same learning cycle as in the second exemplary embodiment, etc. (e.g., the process of step S11 to step S15 and step S21 to step S24 illustrated in FIG. 17) is executed multiple times.

When it is determined that the judgment accuracy does not satisfy the predetermined criterion representing linearity, the linearization quantity determination unit 44 changes the linearization quantity so that the activation function represents a non-linear function. For example, if the Scaling Tanh shown in Equation 3 above is used as the activation function, the linearization quantity determination unit 44 changes $\gamma$ back to 1. On the other hand, if it is determined that the judgment accuracy satisfies a predetermined criterion representing linearity, the linearization quantity determination unit 44 does not change the linearization quantity and the subsequent learning process is continued. The setting of the criterion representing linearity is arbitrary, and the linearization quantity determination unit 44 may, for example, determine whether or not linearity is represented by whether or not the judgment accuracy has reached the predetermined target accuracy.

In this way, it is possible to switch between linear and nonlinear states without changing the model, simply by changing the linearization quantity which is a parameter by the linearization quantity determination unit 44.

The training data determination unit 20, the test data determination unit 22, the learning unit 32, the linearization quantity determination unit 44, and the aggregation unit 50 are realized by a computer processor that operates according to a program (neural network learning program).

Figure 22:
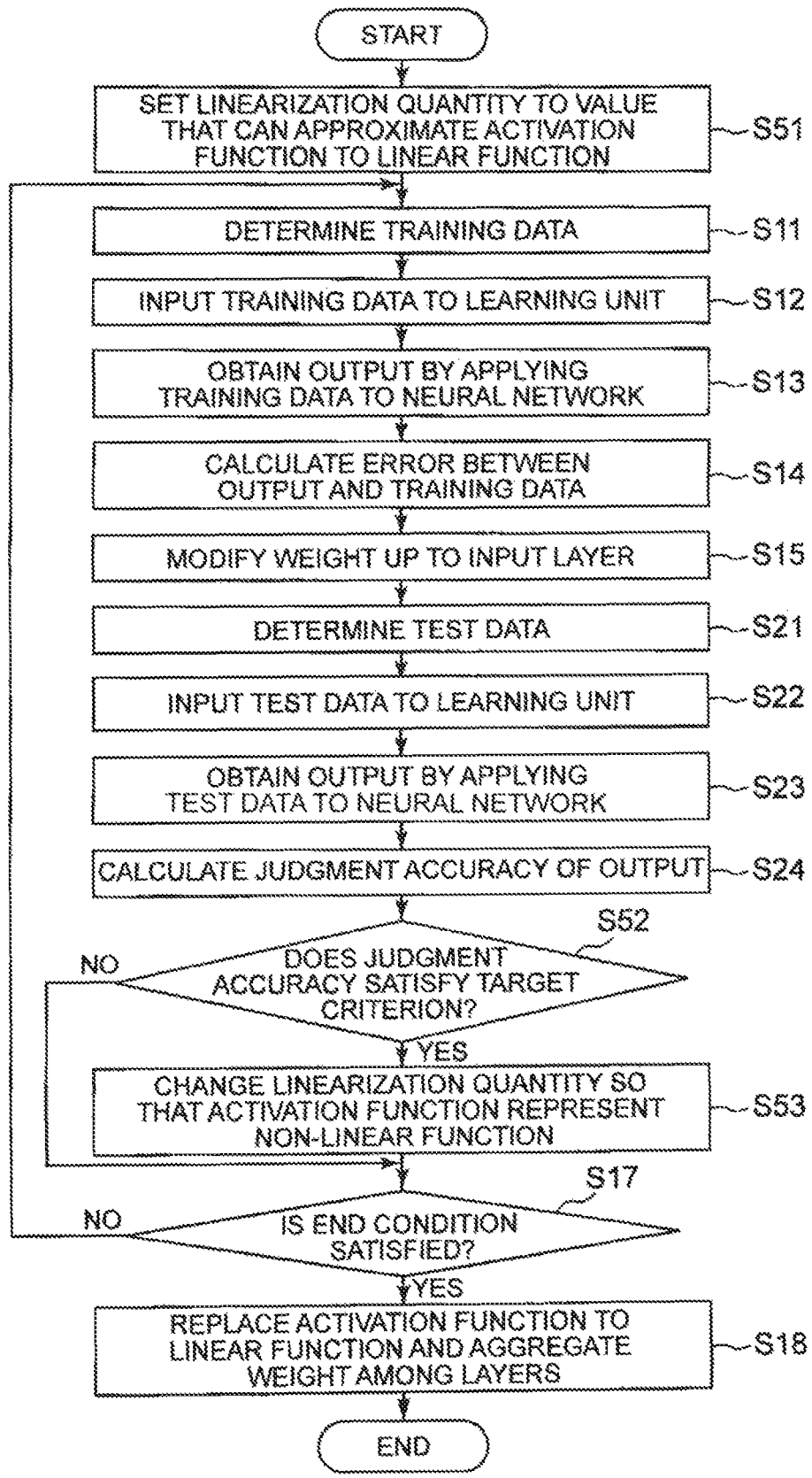
FIG. 22 It depicts a flowchart depicting an example of the operation of the neural network learning device of the fourth exemplary embodiment.

Next, the operation of the neural network learning device of this exemplary embodiment will be described. FIG. 22 is a flowchart depicting an example of the operation of the neural network learning device of this exemplary embodiment. First, the linearization quantity determination unit 44 sets the linearization quantity to a value that can approximate the activation function to a linear function before the learning process takes place (Step S51). Thereafter, the learning process of the neural network and the calculation process of the judgment accuracy are performed in the same manner as the processes from step S11 to step S15 and from step S21 to step S24 illustrated in FIG. 17.

The linearization quantity determination unit 44 determines whether the judgment accuracy satisfies the predetermined criterion representing linearity (i.e., whether it has linearity or not) (Step S52). If it is determined that the criterion is not satisfied (i.e., it does not have linearity) (No in Step S52), the linearization quantity determination unit 44 changes the linearization quantity so that the activation function represents a non-linear function (Step S53). On the other hand, if it is determined that the criterion is satisfied (i.e., the linearity is present) (Yes in Step S52), the linearization quantity is maintained, and the process from Step S17 onward is performed.

As described above, in the present exemplary embodiment, the linearization quantity determination unit 44 sets the linearization quantity to a value that can approximate the activation function to a linear function before the start of learning by the learning unit 32. Then, as a result of learning by the learning unit 32, if it is determined that the judgment accuracy does not satisfy the predetermined criterion representing linearity, the linearization quantity is changed so that the activation function represents a non-linear function, and if it is determined that the above criterion is satisfied, learning by the learning unit 32 is continued with the linearization quantity maintained. Thus, in addition to the effects of the above exemplary embodiment, it is possible to switch between linear state and nonlinear state without changing the model of the neural network.

Exemplary Embodiment 5

Next, it is described a fifth exemplary embodiment of the neural network learning device according to the present invention. In the fourth exemplary embodiment, it is described a case in which, when the linearization quantity determination unit 44 determines that the judgment accuracy satisfies a predetermined criterion representing linearity, the model learning by the learning unit 32 is continued while maintaining the linearization quantity. In this exemplary embodiment, it is described a method of reconstructing the model in the fourth exemplary embodiment when it is determined that the predetermined criterion representing linearity is satisfied.

Figure 23:
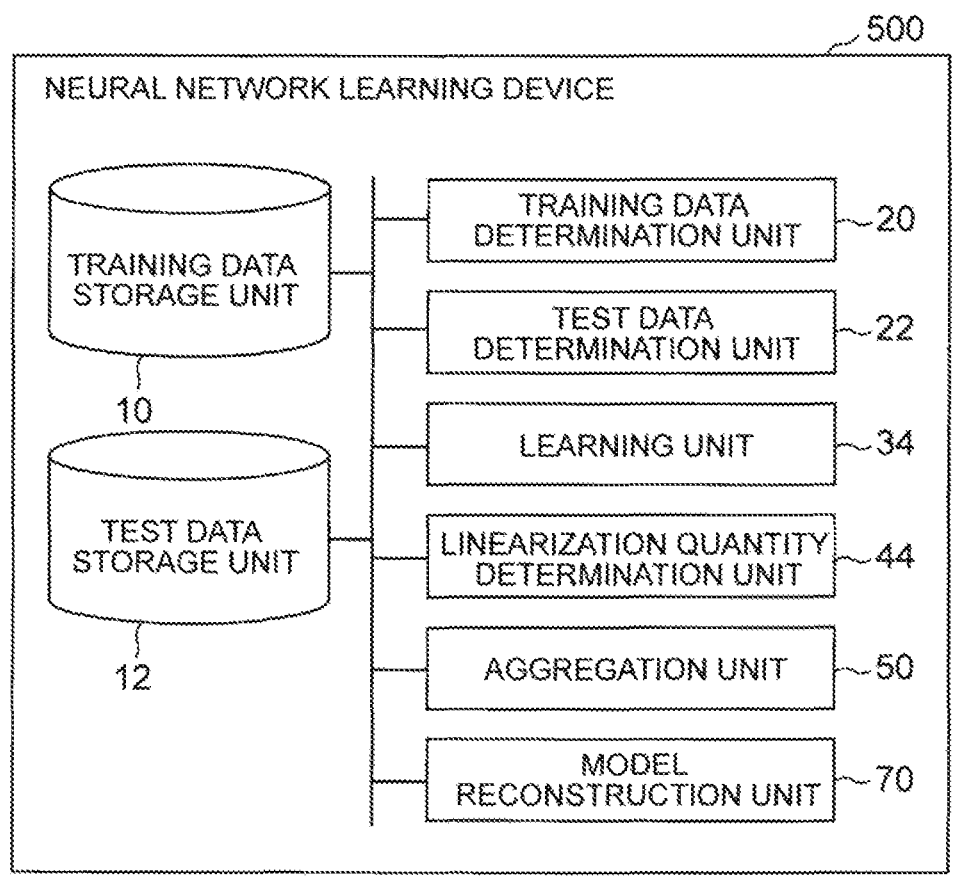
FIG. 23 It depicts a block diagram depicting an example of the structure of a fifth exemplary embodiment of a neural network learning device according to the present invention.

FIG. 23 is a block diagram depicting an example of a fifth exemplary embodiment of a neural network learning device according to the present invention. The neural network learning device 500 of this exemplary embodiment has a training data storage unit 10, a test data storage unit 12, a training data determination unit 20, a test data determination unit 22, a learning unit 34, a linearization quantity determination unit 44, an aggregation unit 50, and a model reconstruction unit 70. In other words, the neural network learning device 500 of this exemplary embodiment differs from the neural network learning device 400 of the fourth exemplary embodiment in that the learning unit 34 is provided instead of the learning unit 32, and the model reconstruction unit 70 is further provided. It should be noted that the neural network learning device 500 of this exemplary embodiment may be equipped with an input dimension addition unit 60.

When it is determined by the linearization quantity determination unit 44 that the predetermined criterion representing linearity is satisfied, the model reconstruction unit 70 removes all intermediate layers from the neural network under learning and reconstructs the neural network into a model in which the input layer and the output layer are connected by an activation function representing a linear function. The model reconstruction unit 70, for example, reconstructs the neural network illustrated in FIG. 34 into the neural network illustrated in FIG. 32. Thereafter, the same learning cycle as in the second exemplary embodiment, etc. (e.g., the process of step S11 to step S15 and step S21 to step S24 illustrated in FIG. 17) is executed.

FIG. 24 is an explanatory diagram depicting an example of how to reconstruct a neural network. As illustrated in FIG. 24, it is supposed that the model definition includes a makelink( ) function that defines the network structure and a forward( ) function that defines the activation function of the intermediate layer. In the model definition illustrated in FIG. 24, the link structure shall be represented by link (number of inputs, number of outputs), and the weight values are included in the link structure. The output column is represented by gstanh (input column, link structure, γ in generalized Scaling Tanh), which represents generalized Scaling Tanh, or linear (input column, link structure), which represents a linear function.

Figure 32:
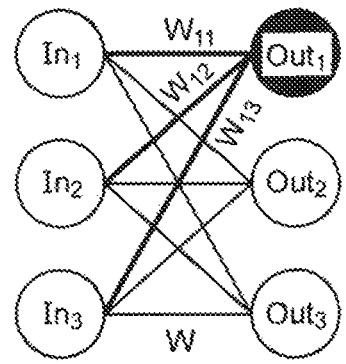
FIG. 32 It depicts an explanatory diagram depicting a structure of a neural network.
Figure 33:
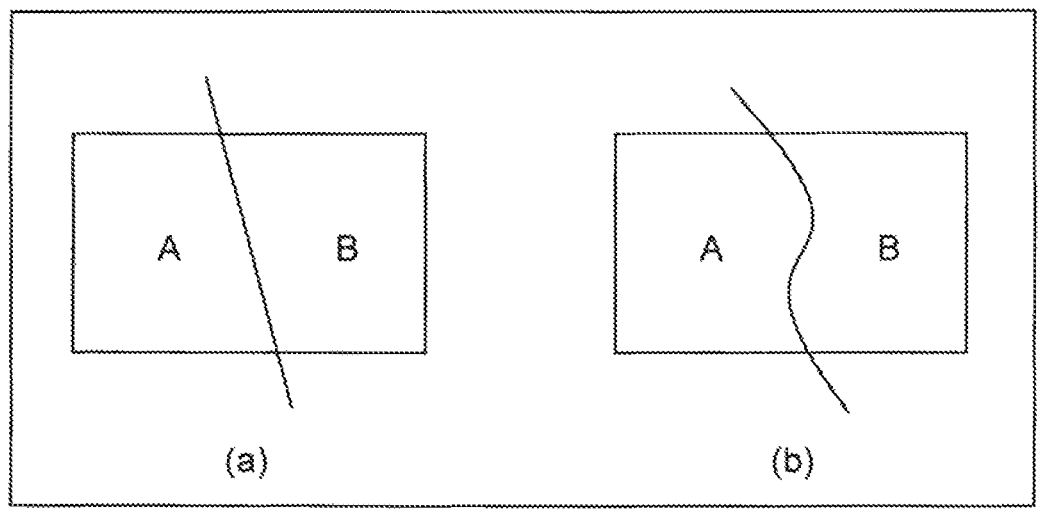
FIG. 33 It depicts an explanatory diagram depicting a linearly separable problem and a linearly non-separable problem.
Figure 34:
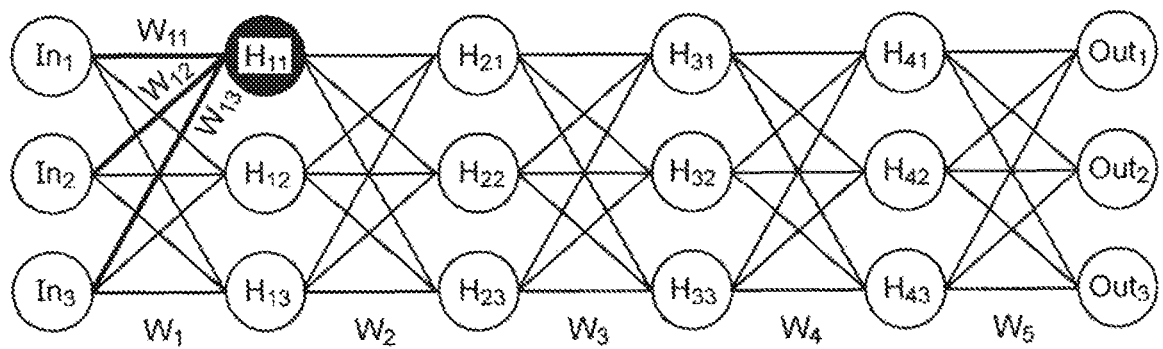
FIG. 34 It depicts an explanatory diagram depicting a multilayer perceptron.
Figure 35:
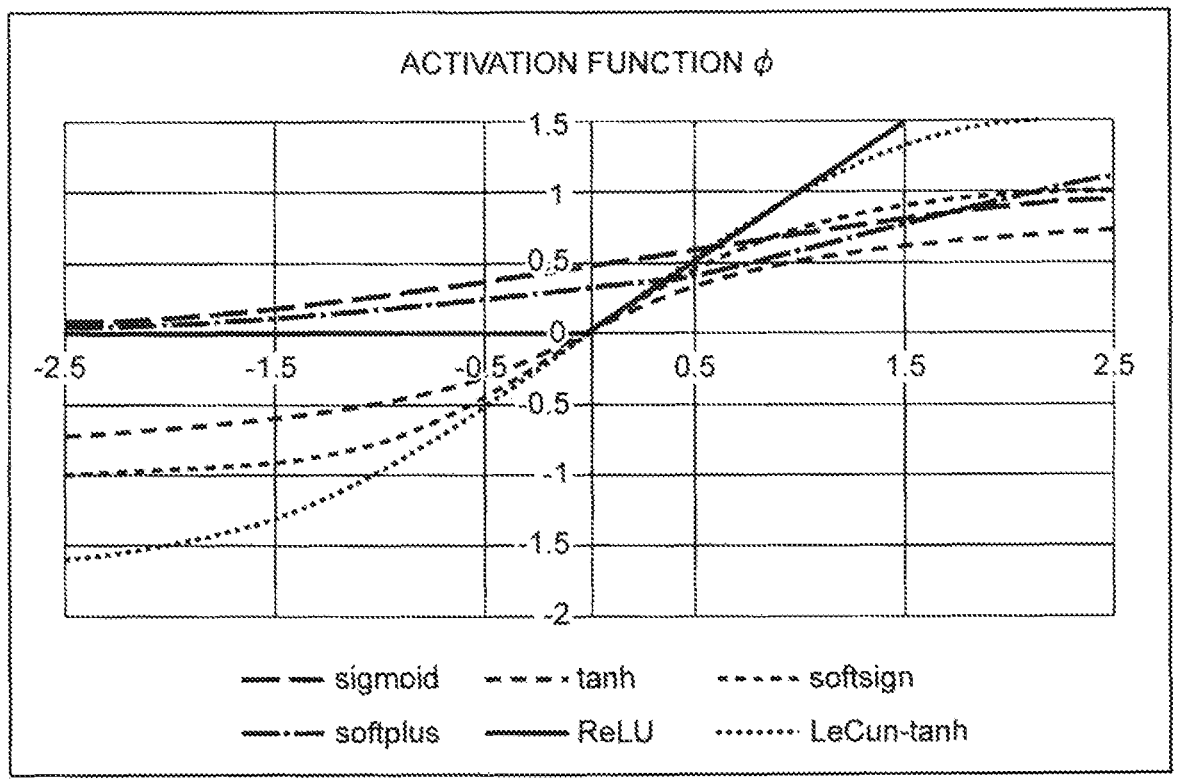
FIG. 35 It depicts an explanatory diagram depicting a nonlinear function.
Figure 36:
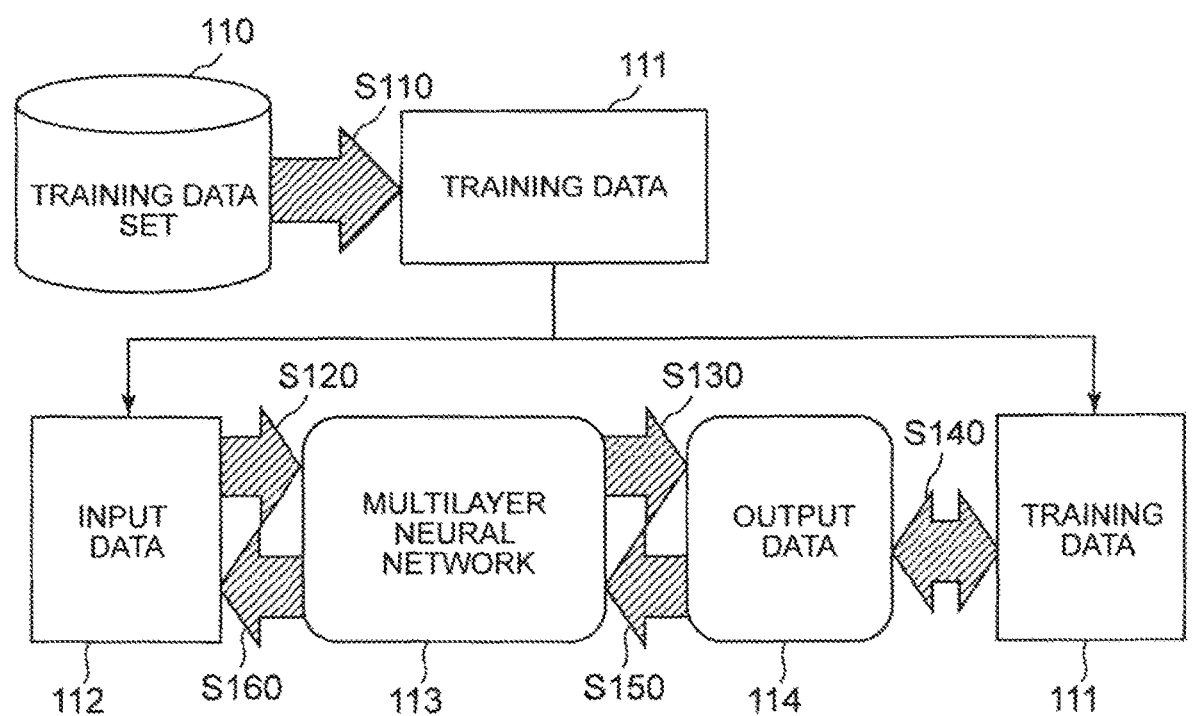
FIG. 36 It depicts an explanatory diagram depicting an example of a general method for learning a neural network using a computer.

For example, when replacing the structure illustrated in FIG. 34 with the structure illustrated in FIG. 32, the model reconstruction unit 70 may mechanically reconstruct the model without relying on the structure of the intermediate layer by rewriting the model definition from model definition D1 to model definition D2 illustrated in FIG. 24.

FIG. 25 is an explanatory diagram depicting another example of how to reconstruct a neural network. In general, a network in which the number of outputs is the same as the number of inputs is added to the outputs and processed. In the example shown in FIG. 24, the method of replacing all the activation functions in the intermediate layer with linear functions is used, but in the example shown in FIG. 25, the method of keeping the softmax function in the final stage is used. Here, the output column is assumed to be represented by softmax (input column, link structure), which represents the softmax function.

For example, when replacing the structure illustrated in FIG. 34 with the structure illustrated in FIG. 32, the model reconstruction unit 70 may mechanically reconstruct the model without relying on the structure of the intermediate layer by rewriting the model definition from model definition D3 to model definition D4 illustrated in FIG. 25.

In this way, since the learning unit 32 performs learning using a neural network connected with an activation function representing a linear function, the weights W between layers are calculated by learning. Therefore, the rounding error caused by the sum-of-products calculation can be suppressed, which makes it possible to improve the accuracy of the neural network.

The training data determination unit 20, the test data determination unit 22, the learning unit 32, the linearization quantity determination unit 44, the aggregation unit 50, and the model reconstruction unit 70 are realized by a computer processor that operates according to a program (neural network learning program).

Next, the operation of the neural network learning device of this exemplary embodiment will be described. FIG. 26 is a flowchart depicting an example of the operation of the neural network learning device of this exemplary embodiment. The process of learning the neural network by setting the linearization quantity to a value that can approximate the activation function to a linear function, and up to judging the linearity is the same as the process from step S51 to step S53 illustrated in FIG. 22. However, the process after Yes in step S52 is different.

That is, when it is determined that the judgment accuracy satisfies the predetermined criterion representing linearity (Yes in step S52), the model reconstruction unit 70 removes all intermediate layers from the neural network under learning and reconstructs the neural network into a model in which the input layer and output layer are connected by an activation function representing a linear function (Step S61). Thereafter, the neural network is learned by repeating the process from step S11 onwards using the reconstructed model.

As described above, in this exemplary embodiment, when it is determined that the judgment accuracy satisfies a predetermined criterion representing linearity, the model reconstruction unit 70 removes all intermediate layers from the neural network under learning and reconstructs the neural network into a model in which the input layer and the output layer are connected by an activation function representing a linear function. In this way, the learning unit 32 learns using the reconstructed model, which makes it possible to improve the accuracy of the neural network.

Exemplary Embodiment 6

Next, it is described a sixth exemplary embodiment of the neural network learning device according to the present invention. In the fifth exemplary embodiment, a method of reconstructing a model when it is determined that the judgment accuracy satisfies a predetermined criterion representing linearity is described. This exemplary embodiment describes a method of reconstructing a model by identifying the portions with linearity and the portions where nonlinearity remains, when it is determined that the predetermined criterion representing linearity is satisfied in the fifth exemplary embodiment.

Figure 27:
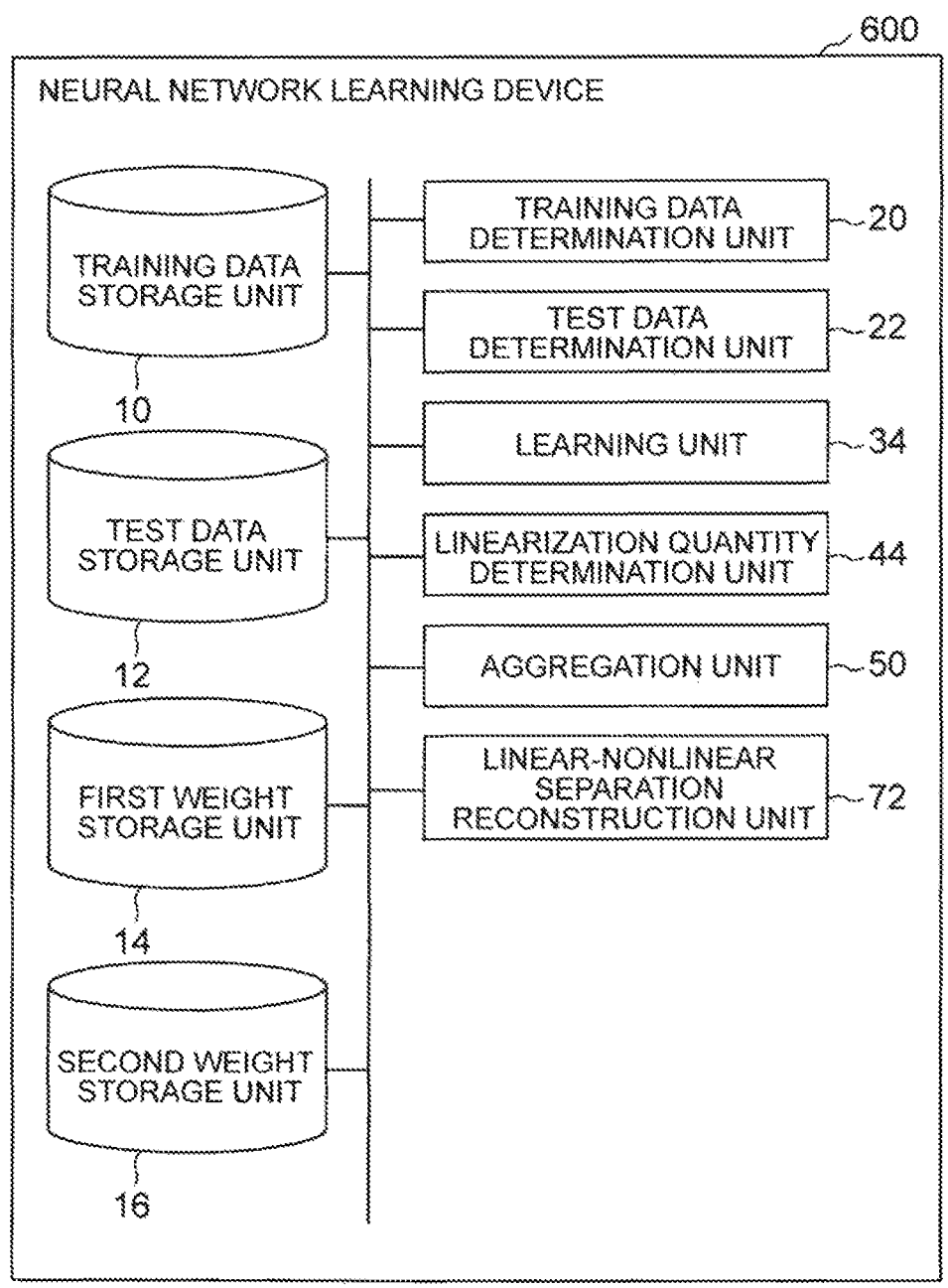
FIG. 27 It depicts a block diagram depicting an example of the structure of a sixth exemplary embodiment of a neural network learning device according to the present invention.

FIG. 27 is a block diagram depicting an example of a sixth exemplary embodiment of a neural network learning device according to the present invention. The neural network learning device 600 of this exemplary embodiment has a training data storage unit 10, a test data storage unit 12, a first weight storage unit 14, a second weight storage unit 16, a training data determination unit 20, a test data determination unit 22, a learning unit 34, a linearization quantity determination unit 44, an aggregation unit 50, and a linear-nonlinear separation reconstruction unit 72.

That is, compared to the neural network learning device 500 of the fifth exemplary embodiment, the neural network learning device 600 of this exemplary embodiment is different in that it has a linear-nonlinear separation reconstruction unit 72 instead of a model reconstruction unit 70, and further has a first weight storage unit 14 and a second weight storage unit 16. It should be noted that the neural network learning device 600 of this exemplary embodiment may have an input dimension addition unit 60. Also, the first weight storage unit 14 and the second weight storage unit 16 may be realized in the same storage device.

In this exemplary embodiment, even if it is determined by the linearization quantity determination unit 44 that the predetermined criterion representing linearity is satisfied, the learning unit 34 continues the learning process. When the learning by the learning unit 34 is completed, the linear-nonlinear separation reconstruction unit 72, if it is determined that the predetermined criterion representing linearity is satisfied, stores the weights of the learned neural network (hereinafter referred to as the first weights) in the first weight storage unit 14.

Thereafter, the learning unit 34 and the linearization quantity determination unit 44 learn the neural network by increasing the linearization quantity γ based on the judgment accuracy, in the same manner as the learning unit 32 and the linearization quantity determination unit 42 of the second exemplary embodiment. Then, the linearization quantity determination unit 44 stores the weights of the neural network learned when the linearization quantity γ becomes sufficiently large (e.g., about 1000 times the original) (hereinafter referred to as the "second weights") in the second weight storage unit 16.

The linear-nonlinear separation reconstruction unit 72 identifies the input in which the non-linearity remains based on the difference between the first weight and the second weight, and reconstructs the neural network separated into a part having linearity and a part having non-linearity. Specifically, the linear-nonlinear separation reconstruction unit 72 configures the neural network so as to remove the layer where the difference between the weights of the corresponding layers in the first and second weights is smaller than a predetermined criterion as the layer with linearity.

FIG. 28 is an explanatory diagram depicting an example of the process of reconstructing a neural network. For example, it is assumed that the structure illustrated in FIG. 34 is defined as the model definition D5 illustrated in FIG. 28. The matrix of weights (first weights) stored in the first weight storage unit 14 shall be M.W1 to M.W5, and the matrix of weights (second weights) stored in the second weight storage unit 16 shall be N.W1 to N.W5.

The linear-nonlinear separation reconstruction unit 72 calculates the difference of weights for each layer to determine whether to reconstruct the neural network. The linear-nonlinear separation reconstruction unit 72 may calculate the difference of weights for each layer, or may calculate the quotient of weights for each layer. Specifically, the linear-nonlinear separation reconstruction unit 72 may calculate (N.W1-M.W1), . . . , (N.W5-M.W5), or (N.W1/M.W1), . . . , (N.W5/M.W5). If the calculated difference is 0, or if the calculated quotient is 1, the layer corresponding to that weight is determined not to contribute to the improvement of accuracy, and the linear-nonlinear separation reconstruction unit 72 determines that the layer is to be removed.

Then, the linear-nonlinear separation reconstruction unit 72 removes the number of layers determined to be removed from the total number of layers. For example, if (N.W1-M.W1)=0 or (N.W1/M.W1)=1 is satisfied, but the other layers do not satisfy the above conditions, the linear-nonlinear separation reconstruction unit 72 removes one layer from all layers. For example, if the model definition D5 illustrated in FIG. 28 has been made, the linear-nonlinear separation reconstruction unit 72 reconstructs the structure of the neural network as in the model definition D6.

The training data determination unit 20, the test data determination unit 22, the learning unit 32, the linearization quantity determination unit 44, the aggregation unit 50, and the linear-nonlinear separation reconstruction unit 72 are realized by a computer processor operating according to a program (neural network learning program).

Figure 29:
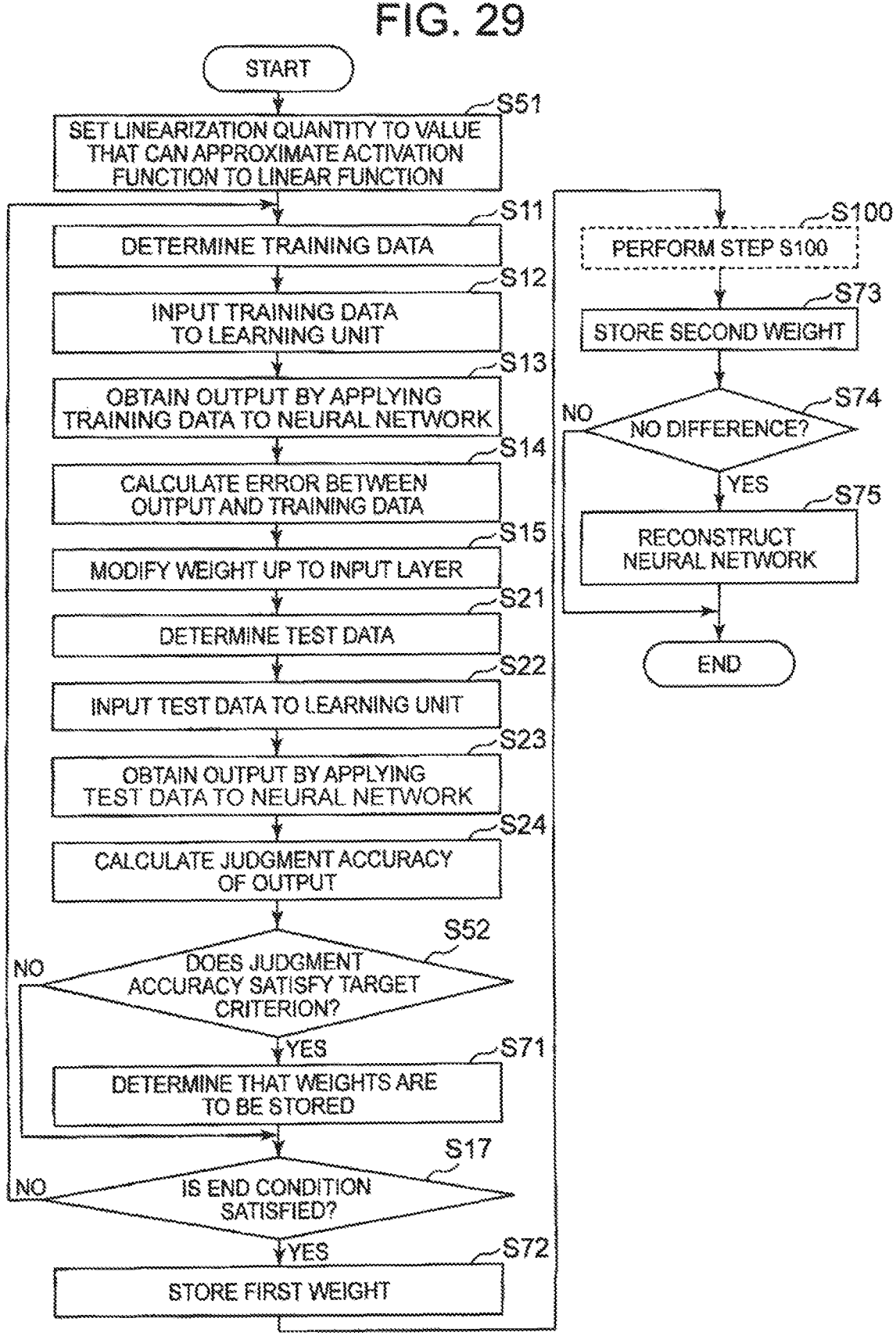
FIG. 29 It depicts a flowchart depicting an example of the operation of the neural network learning device of the sixth exemplary embodiment.

Next, the operation of the neural network learning device of this exemplary embodiment will be described. FIG. 29 is a flowchart depicting an example of the operation of the neural network learning device of this exemplary embodiment. The process of learning the neural network by setting the linearization quantity to a value that can approximate the activation function to a linear function, and up to judging the linearity is the same as the process from step S51 to step S53 illustrated in FIG. 22. However, the process after Yes in step S52 is different.

That is, when it is determined that the judgment accuracy satisfies the predetermined criterion representing linearity (Yes in step S52), the linear-nonlinear separation reconstruction unit 72 determines that the weights of the learned neural network are to be stored in the first weight storage unit 14 upon completion of learning by the learning unit 34 (Step S71). The learning process is repeated until the end condition is satisfied (No in step S17).

If it is determined that the end condition is satisfied (Yes in step S17), the linear-nonlinear separation reconstruction unit 72 stores the weights of the learned neural network (first weights) in the first weight storage unit 14 (Step S72). Further, the learning unit 34 performs the process of step S100 illustrated in FIG. 17, in which the neural network is learned while increasing the linearization quantity γ based on the judgment accuracy, as shown in the second exemplary embodiment. Then, the linearization quantity determination unit 44 stores the weights of the learned neural network (second weights) in the second weight storage unit 16 (Step S73).

The linear-nonlinear separation reconstruction unit 72 determines whether there is no difference between the first weight and the second weight (Step S74). When it is determined that there is no difference (Yes in Step S74), the linear-nonlinear separation reconstruction unit 72 reconstructs the neural network (Step S75). On the other hand, when it is determined that there is a difference (No in step S74), the process is terminated.

As described above, in the present exemplary embodiment, the linearization quantity determination unit 44 sets the linearization quantity to a value that can approximate the activation function to a linear function before the start of learning by the learning unit 34, and stores the first weight when it is determined that the result of learning satisfies a predetermined criterion that the judgment accuracy represents linearity. Furthermore, the learning unit 34 learns by setting the linearization quantity to a value where the activation function represents a non-linear function, and stores the result of learning as the second weight. Then, the linear-nonlinear separation reconstruction unit 72 reconstructs the neural network so as to remove the layer where the difference between the weights of the corresponding layers in the first and second weights is smaller than a predetermined criterion as the layer with linearity. Thus, the neural network can be learned so as to reduce the amount of computation while improving the accuracy.

Figure 30:
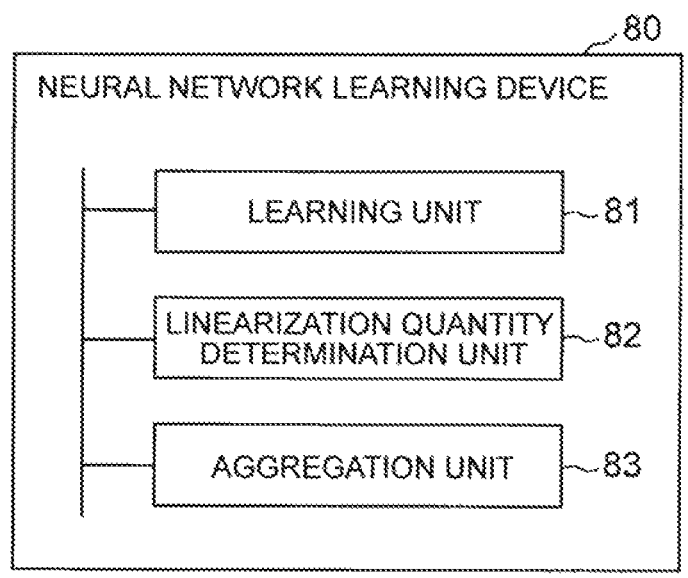
FIG. 30 It depicts a block diagram depicting an overview of the neural network learning device according to the present invention.

Next, an overview of the present invention will be described. FIG. 30 is a block diagram depicting an overview of the neural network learning device according to the present invention. The neural network learning device 80 according to the present invention includes: a learning unit 81 (e.g., a learning unit 30, 32, 34) for learning a neural network; a linearization quantity determination unit 82 (e.g., linearization quantity determination unit 40, 42, 44) for determining linearization quantity (e.g., linearization quantity γ), which is a parameter included in an activation function used in the neural network, and which is a parameter that brings the activation function closer to a linear function by increasing or decreasing itself; and an aggregation unit 83 (e.g., aggregation unit 50) for replacing the activation function, which is determined to converge to a linear function by increasing or decreasing the linearization quantity, with the linear function, and aggregating weights among layers using the replaced linear function.

The learning unit 81 calculates evaluation value (e.g., error, evaluation accuracy, number of outputs, etc.) based on output by the neural network in learning the neural network, and the linearization quantity determination unit 82 changes the linearization quantity when the evaluation value satisfies the predetermined criterion.

With such a configuration, it is possible to learn a neural network so as to reduce the amount of computation.

Specifically, the learning unit 81 may calculate judgment accuracy when test data with a correct answer label is input to the neural network. Then, the linearization quantity determination unit 82 may increase or decrease the linearization quantity according to an increase in the judgment accuracy.

In addition, the linearization quantity determination unit 82 may set the linearization quantity to a value that can approximate the activation function to a linear function before a start of learning by the learning unit, and when it is determined that the judgment accuracy does not satisfy the predetermined criterion representing linearity as a result of the learning, change the linearization quantity so that the activation function represents a nonlinear function, and when it is determined that the judgment accuracy satisfies the predetermined criterion, continue learning by the learning unit while maintaining the linearization quantity.

In addition, the neural network learning device 80 may include a model reconstruction unit (e.g., model reconstruction unit 70) for, when it is determined that the judgment accuracy satisfies the predetermined criterion representing linearity, removing all intermediate layers from the neural network being trained, and reconstructing the neural network into a model that connects an input layer and an output layer with the activation function that represents a linear function. Then, the learning unit 81 may learn the neural network using the reconstructed model.

On the other hand, the learning unit 81 may calculate an error between training data and output by the neural network in learning the neural network. Then, the linearization quantity determination unit 82 may increase or decrease the linearization quantity according to decrease in the error.

In addition, the neural network learning device 80 may include an input dimension addition unit (e.g., the input dimension addition unit 60) for, when the evaluation value worsens after the linearization quantity is changed, adding values to the training data so as to increase the number of dimensions, and modifying structure of the neural network so as to increase the number of dimensions of input layer of the neural network.

Figure 31:
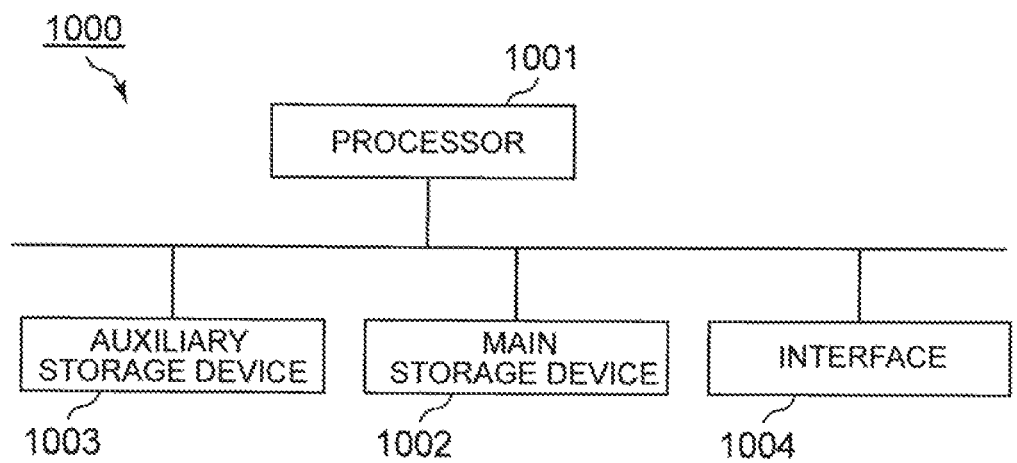
FIG. 31 It depicts a summarized block diagram depicting a configuration of a computer for at least one exemplary embodiment.

FIG. 31 is a summarized block diagram depicting a configuration of a computer for at least one exemplary embodiment. A computer 1000 has a processor 1001, a main storage device 1002, an auxiliary storage device 1003, and an interface 1004.

The neural network learning device described above is implemented in the computer 1000. The operation of each of the above-mentioned processing units is stored in the auxiliary storage 1003 in the form of a program (neural network learning program). The processor 1001 reads the program from the auxiliary storage 1003, expands it to the main memory 1002, and executes the above processing according to the program.

In at least one exemplary embodiment, the auxiliary storage device 1003 is an example of a non-temporary tangible medium. Other examples of non-temporary tangible media include magnetic disks, optical magnetic disks, CD-ROM (Compact Disc Read-only memory), DVD-ROM (Read-only memory), semiconductor memory, etc., which are connected via the interface 1004. When the program is delivered to the computer 1000 via a communication line, the computer 1000 that receives the delivery may extract the program into the main memory device 1002 and execute the above process.

The program may also be one that realizes some of the aforementioned functions. Furthermore, said program may be a so-called difference file (difference program) that realizes the aforementioned functions in combination with other programs already stored in the auxiliary storage device 1003.

Some or all of the above exemplary embodiments may also be described in the following appendices, but are not limited to.

(Supplementary note 1) A neural network learning device comprising: a learning unit for learning a neural network; a linearization quantity determination unit for determining linearization quantity, which is a parameter included in an activation function used in the neural network, and which is a parameter that brings the activation function closer to a linear function by increasing or decreasing itself; and an aggregation unit for replacing the activation function, which is determined to converge to a linear function by increasing or decreasing the linearization quantity, with the linear function, and aggregating weights among layers using the replaced linear function, wherein the learning unit calculates evaluation value based on output by the neural network in learning the neural network, and the linearization quantity determination unit changes the linearization quantity when the evaluation value satisfies the predetermined criterion.

(Supplementary note 2) The neural network learning device according to claim 1, wherein the learning unit calculates judgment accuracy when test data with a correct answer label is input to the neural network, and the linearization quantity determination unit increases or decreases the linearization quantity according to an increase in the judgment accuracy.

(Supplementary note 3) The neural network learning device according to claim 2, wherein the linearization quantity determination unit sets the linearization quantity to a value that can approximate the activation function to a linear function before a start of learning by the learning unit, and when it is determined that the judgment accuracy does not satisfy the predetermined criterion representing linearity as a result of the learning, changes the linearization quantity so that the activation function represents a nonlinear function, and when it is determined that the judgment accuracy satisfies the predetermined criterion, continues learning by the learning unit while maintaining the linearization quantity.

(Supplementary note 4) The neural network learning device according to claim 3, further comprising a model reconstruction unit for, when it is determined that the judgment accuracy satisfies the predetermined criterion representing linearity, removing all intermediate layers from the neural network being trained, and reconstructing the neural network into a model that connects an input layer and an output layer with the activation function that represents a linear function, wherein the learning unit learns the neural network using the reconstructed model.

(Supplementary note 5) The neural network learning device according to claim 1, wherein the learning unit calculates an error between training data and output by the neural network in learning the neural network, and the linearization quantity determination unit increases or decreases the linearization quantity according to decrease in the error.

(Supplementary note 6) The neural network learning device according to any one of claims 1 to 5, further comprising an input dimension addition unit for, when the evaluation value worsens after the linearization quantity is changed, adding values to the training data so as to increase the number of dimensions, and modifying structure of the neural network so as to increase the number of dimensions of input layer of the neural network.

(Supplementary note 7) The neural network learning device according to any one of claims 1 to 6, further comprising a linear-nonlinear separation reconstruction unit for reconstructing structure of the neural network, wherein the linearization quantity determination unit sets the linearization quantity to a value that can approximate the activation function to a linear function before a start of learning by the learning unit, and stores first weight when it is determined that judgment accuracy satisfies the predetermined criterion representing linearity as a result of the learning, the learning unit learns the neural network by setting the linearization quantity to the value where the activation function indicates a nonlinear function, and stores the result of the learning as second weight, and the linear-nonlinear separation reconstruction unit reconstructs the neural network so that a layer in which the difference between the first weight and the corresponding weight in the second weight is smaller than a predetermined criterion is removed as a layer having linearity.

(Supplementary note 8) A neural network learning method comprising: learning a neural network; in learning of the neural network, calculating an evaluation value based on the output of the neural network; determining linearization quantity, which is a parameter included in an activation function used in the neural network, and which is a parameter that brings the activation function closer to a linear function by increasing or decreasing itself; changing the linearization quantity when the evaluation value satisfies the predetermined criterion; and replacing the activation function, which is determined to converge to a linear function by increasing or decreasing the linearization quantity, with the linear function, and aggregating weights among layers using the replaced linear function.

(Supplementary note 9) The neural network learning method according to claim 8, further comprising calculating judgment accuracy when test data with a correct answer label is input to the neural network; and increasing or decreasing the linearization quantity according to an increase in the judgment accuracy.

(Supplementary note 10) The neural network learning method according to claim 8, further comprising calculating an error between training data and output by the neural network in learning the neural network; and increasing or decreasing the linearization quantity according to decrease in the error.

(Supplementary note 11) A neural network learning program causing a computer to execute: a learning process of learning a neural network; a linearization quantity determination process of determining linearization quantity, which is a parameter included in an activation function used in the neural network, and which is a parameter that brings the activation function closer to a linear function by increasing or decreasing itself; and an aggregation process of replacing the activation function, which is determined to converge to a linear function by increasing or decreasing the linearization quantity, with the linear function, and aggregating weights among layers using the replaced linear function, wherein in the learning process, the computer is caused to calculate evaluation value based on output by the neural network in learning the neural network, and in the linearization quantity determination process, the computer is caused to change the linearization quantity when the evaluation value satisfies the predetermined criterion.

(Supplementary note 12) The neural network learning program according to claim 11, wherein in the learning process, the computer is caused to calculate judgment accuracy when test data with a correct answer label is input to the neural network, and in the linearization quantity determination process, the computer is caused to increase or decrease the linearization quantity according to an increase in the judgment accuracy.

(Supplementary note 13) The neural network learning program according to claim 11, wherein in the learning process, the computer is caused to calculate an error between training data and output by the neural network in learning the neural network, and in the linearization quantity determination process, the computer is caused to increase or decrease the linearization quantity according to decrease in the error.

INDUSTRIAL APPLICABILITY

The present invention is suitably applicable to a neural network learning device that learns neural networks. For example, in the field of automobiles, the ability to reduce the amount of computation makes it possible to speed up and save power of in-vehicle ECUs (Electronic Control Units), reduce storage capacity (memory capacity, etc.), shorten the development of new functions, and verify authentication functions using weights W.

Although the present invention has been described above with reference to exemplary embodiments and examples, the present invention is not limited to the above exemplary embodiments and examples. Various changes can be made to the configuration and details of the present invention that can be understood by those skilled in the art within the scope of the present invention.

This application claims priority based on Japanese Patent Application 2018-247337 filed on Dec. 28, 2018, the entire disclosure of which is hereby incorporated herein.

EXPLANATIONS OF CONFIGURATION

10 Training data storage unit
12 Test data storage unit
14 First weight storage unit
16 Second weight storage unit
20 Training data determination unit
22 Test data determination unit
30, 32, 34 Learning unit
40, 42, 44 Linearization quantity determination unit
50 Aggregation unit
60 Input dimension addition unit
70 Model reconstruction unit
72 Linear-nonlinear separation reconstruction unit
100, 200, 300, 400, 500, 600 Neural network learning device

What is claimed is:

1. A neural network learning device comprising a hardware processor configured to execute software code to:
   set a linearization quantity to a value that can approximate an activation function to a linear function before learning a neural network;
   learn a neural network by setting the linearization quantity to the value where the activation function indicates a nonlinear function, and store a result of the learning as second weight;
   store a first weight when having determined that a judgment accuracy satisfies a predetermined criterion representing linearity as a result of the learning;
   determine a linearization quantity, which is a parameter included in the activation function that is used in the neural network, and which is a parameter that brings the activation function closer to the linear function via an increase or decrease of the linearization;
   replace the activation function, which is determined to converge to a linear function by increasing or decreasing the linearization quantity, with the linear function, and aggregate weights among layers using the replaced linear function;
   calculate an evaluation value based on output by the neural network in learning the neural network;
   change the linearization quantity when the evaluation value satisfies the predetermined criterion; and reconstruct the neural network so that a layer in which a difference between the first weight and the corresponding weight in the second weight is smaller than a predetermined criterion is removed as a layer having linearity.

2. The neural network learning device according to claim 1,
   wherein the hardware processor is configured to execute the software code to:
   calculate the judgment accuracy when test data with a correct answer label is input to the neural network; and
   increase or decrease the linearization quantity according to an increase in the judgment accuracy.

3. The neural network learning device according to claim 2, wherein the hardware processor is configured to execute the software code to
   set the linearization quantity to a value that can approximate the activation function to the linear function before learning the neural network, and when having determined that the judgment accuracy does not satisfy the predetermined criterion representing linearity as a result of the learning, change the linearization quantity so that the activation function represents a nonlinear function, and when having determined that the judgment accuracy satisfies the predetermined criterion, continue learning while maintaining the linearization quantity.

4. The neural network learning device according to claim 3, wherein the hardware processor is configured to execute the software code to:
   when having determined that the judgment accuracy satisfies the predetermined criterion representing linearity, remove all intermediate layers from the neural network being trained, and reconstruct the neural network into a model that connects an input layer and an output layer with the activation function that represents the linear function; and
   learn the neural network using the reconstructed model.

5. The neural network learning device according to claim 1, wherein the hardware processor is configured to execute the software code to:
   calculate an error between training data and output by the neural network in learning the neural network, and
   increase or decrease the linearization quantity according to decrease in the error.

6. The neural network learning device according to claim 1, wherein the hardware processor is configured to execute the software code to,
   when the evaluation value worsens after the linearization quantity is changed, add values to training data so as to increase a number of dimensions, and modify a structure of the neural network so as to increase the number of dimensions of an input layer of the neural network.

7. A neural network learning method performed by a computer and comprising:
   setting a linearization quantity to a value that can approximate an activation function to a linear function before learning a neural network;
   learning a neural network by setting the linearization quantity to the value where the activation function indicates a nonlinear function, and store a result of the learning as second weight;

storing a first weight when having determined that a judgment accuracy satisfies a predetermined criterion representing linearity as a result of the learning;

determining a linearization quantity, which is a parameter included in the activation function that is used in the neural network, and which is a parameter that brings the activation function closer to the linear function via an increase or decrease of the linearization quantity;

replacing the activation function, which is determined to converge to a linear function by increasing or decreasing the linearization quantity, with the linear function, and aggregate weights among layers using the replaced linear function;

calculating an evaluation value based on output by the neural network in learning the neural network;

changing the linearization quantity when the evaluation value satisfies the predetermined criterion; and reconstructing the neural network so that a layer in which a difference between the first weight and the corresponding weight in the second weight is smaller than a predetermined criterion is removed as a layer having linearity.

8. He neural network learning method according to claim 7, further comprising:

calculating the judgment accuracy when test data with a correct answer label is input to the neural network; and increasing or decreasing the linearization quantity according to an increase in the judgment accuracy.

9. The neural network learning method according to claim 7, further comprising:

calculating an error between training data and output by the neural network in learning the neural network; and increasing or decreasing the linearization quantity according to decrease in the error.

10. A non-transitory computer readable information recording medium storing a neural network learning program executable by a processor to perform a method comprising:

setting a linearization quantity to a value that can approximate an activation function to a linear function before learning a neural network;

learning a neural network by setting the linearization quantity to the value where the activation function indicates a nonlinear function, and store a result of the learning as second weight;

storing a first weight when having determined that a judgment accuracy satisfies a predetermined criterion representing linearity as a result of the learning;

determining a linearization quantity, which is a parameter included in the activation function that is used in the neural network, and which is a parameter that brings the activation function closer to the linear function via an increase or decrease of the linearization quantity;

replacing the activation function, which is determined to converge to a linear function by increasing or decreasing the linearization quantity, with the linear function, and aggregate weights among layers using the replaced linear function;

calculating an evaluation value based on output by the neural network in learning the neural network;

changing the linearization quantity when the evaluation value satisfies the predetermined criterion; and reconstructing the neural network so that a layer in which a difference between the first weight and the corresponding weight in the second weight is smaller than a predetermined criterion is removed as a layer having linearity.

11. The non-transitory computer readable information recording medium according to claim 10, the method further comprising:

calculating the judgment accuracy when test data with a correct answer label is input to the neural network; and increasing or decreasing the linearization quantity according to an increase in the judgment accuracy.

12. The non-transitory computer readable information recording medium according to claim 10, the method further comprising:

calculating an error between training data and output by the neural network in learning the neural network; and increasing or decreasing the linearization quantity according to decrease in the error.

* * * * *